United States Patent
Uemura et al.

(10) Patent No.: US 9,613,635 B2
(45) Date of Patent: Apr. 4, 2017

(54) AUTOMATED PERFORMANCE TECHNOLOGY USING AUDIO WAVEFORM DATA

(71) Applicant: Yamaha Corporation, Hamamatsu-shi (JP)

(72) Inventors: Norihiro Uemura, Hamamatsu (JP); Eiji Murata, Hamamatsu (JP)

(73) Assignee: Yamaha Corporation, Hamamatsu-shi (JP)

( * ) Notice: Subject to any disclaimer, the term of this patent is extended or adjusted under 35 U.S.C. 154(b) by 0 days.

(21) Appl. No.: 14/411,094

(22) PCT Filed: Jun. 26, 2013

(86) PCT No.: PCT/JP2013/067566
§ 371 (c)(1),
(2) Date: Dec. 23, 2014

(87) PCT Pub. No.: WO2014/003072
PCT Pub. Date: Jan. 3, 2014

(65) Prior Publication Data
US 2015/0154979 A1    Jun. 4, 2015

(30) Foreign Application Priority Data

Jun. 26, 2012   (JP) .................... 2012-142890

(51) Int. Cl.
*G10L 21/04*      (2013.01)
*G10H 7/00*       (2006.01)
(Continued)

(52) U.S. Cl.
CPC .............. *G10L 21/04* (2013.01); *G10H 1/00* (2013.01); *G10H 1/22* (2013.01); *G10H 1/40* (2013.01);
(Continued)

(58) Field of Classification Search
CPC ...................................................... G10L 21/01
See application file for complete search history.

(56) References Cited

U.S. PATENT DOCUMENTS

| 4,542,675 A * | 9/1985 | Hall, Jr. ................... G10H 1/40 84/668 |
| 4,991,487 A * | 2/1991 | Yamaguchi .............. G10H 1/42 84/714 |

(Continued)

FOREIGN PATENT DOCUMENTS

| JP | H09311681 A | 12/1997 |
| JP | 2970396 B2 | 8/1999 |

OTHER PUBLICATIONS

Lee, Eric, and Jan Borchers. "DiMaβ:: a technique for audio scrubbing and skimming using direct manipulation." Proceedings of the 1st ACM workshop on Audio and music computing multimedia. ACM, 2006.*

(Continued)

*Primary Examiner* — Brian Albertalli
(74) *Attorney, Agent, or Firm* — Morrison & Foerster LLP

(57) ABSTRACT

In order to play waveform data back at a variable performance tempo by using waveform data which complies with a desired reference tempo, the present invention performs a timeline-expansion/contraction control on the waveform data to be played back, according to the relationship between the performance tempo and the reference tempo. The present invention also determines whether to limit the playback of the waveform data according to the relationship between the performance tempo and the reference tempo. In the case that playback is to be limited, the present invention stops playback of the waveform data, or reduces the resolution of playback processing and continues playback of the waveform data. The present invention stops playback of the (Continued)

| STYLE DATA NAME | NO. OF PART WHERE ACCOM. PATTERN DATA IS AUDIO WAVEFORM DATA | LIMIT VALUE (MAGNIFICATION) | | | | PRIORITY ORDER AT THE TIME OF SIMUL. REPRO. | PRESENCE/ABSENCE OF CORRE. MIDI-FORMAT ACCOM. PATTERN DATA |
|---|---|---|---|---|---|---|---|
| | | UPPER LIMIT VALUE | | LOWER LIMIT VALUE | | | |
| | | SINGLE-PART PERFORMANCE | PLURAL-PART PERFORMANCE | SINGLE-PART PERFORMANCE | PLURAL-PART PERFORMANCE | | |
| AAAAA | 15 | 1.4 | 1.2 | 0.6 | 0.8 | 1 | ABSENT |
| | 16 | 1.4 | 1.2 | 0.6 | 0.8 | 1 | ABSENT |
| BBBBB | 15 | 1.6 | 1.4 | 0.4 | 0.6 | 1 | PRESENT |
| | 16 | 1.5 | 1.4 | 0.5 | 0.6 | 2 | PRESENT |
| CCCCC | 14 | 1.4 | 1.2 | 0.6 | 0.8 | 2 | ABSENT |
| | 15 | 1.2 | 1.0 | 0.8 | 1.0 | 3 | PRESENT |
| | 16 | 1.4 | 1.1 | 0.6 | 0.9 | 1 | PRESENT | waveform data when, for example, the relationship between the performance tempo and the reference tempo is a relationship in which the waveform data would be played back at a performance tempo which would cause a processing delay or a deterioration of sound quality. As a result, it is possible to preemptively prevent a system freeze and solve problems such as the generation of music which has a slower tempo than the desired performance tempo, or the generation of music which includes the intermittent cutting out of sound due to noise, or a significant reduction to sound quality.

20 Claims, 11 Drawing Sheets

(51) Int. Cl.

| | | |
|---|---|---|
| G10H 1/22 | (2006.01) | |
| G10H 7/02 | (2006.01) | |
| G10L 21/01 | (2013.01) | |
| G11B 20/10 | (2006.01) | |
| G11B 27/00 | (2006.01) | |
| G10H 1/40 | (2006.01) | |
| G10H 1/00 | (2006.01) | |

(52) U.S. Cl.
CPC ............. *G10H 7/006* (2013.01); *G10H 7/02* (2013.01); *G10L 21/01* (2013.01); *G11B 20/10527* (2013.01); *G11B 27/005* (2013.01); *G10H 1/0066* (2013.01); *G10H 2210/385* (2013.01); *G10H 2230/041* (2013.01); *G10H 2250/541* (2013.01); *G10H 2250/621* (2013.01); *G10H 2250/635* (2013.01); *G10H 2250/645* (2013.01)

(56) References Cited

U.S. PATENT DOCUMENTS

| | | | | | |
|---|---|---|---|---|---|
| 5,455,378 | A * | 10/1995 | Paulson | ................. | G10H 1/361 84/610 |
| 5,792,971 | A * | 8/1998 | Timis | ................... | G10H 1/0008 369/83 |
| 5,973,255 | A * | 10/1999 | Tanji | ........................ | G10H 1/40 84/604 |
| 6,169,240 | B1 | 1/2001 | Suzuki | | |
| 6,180,863 | B1 | 1/2001 | Tamura | | |
| 6,207,885 | B1 * | 3/2001 | Nogami | ................... | G10H 1/40 84/605 |
| 6,721,711 | B1 * | 4/2004 | Hoshiai | .................... | G10H 7/02 704/212 |
| 6,967,599 | B2 * | 11/2005 | Choi | ....................... | G10L 21/04 341/61 |
| 7,461,002 | B2 * | 12/2008 | Crockett | .................... | 704/200.1 |
| 7,521,623 | B2 * | 4/2009 | Bowen | .................... | G10H 1/40 84/612 |
| 8,153,882 | B2 * | 4/2012 | Adam | .................. | G10H 1/0066 84/609 |
| 8,812,502 | B2 * | 8/2014 | Takatsuka | .......... | A63B 24/0084 707/737 |
| 8,865,991 | B1 * | 10/2014 | Alves | ...................... | G10H 1/42 84/609 |
| 2002/0053275 | A1 * | 5/2002 | Ogawa | .................... | H04S 1/007 84/662 |
| 2002/0093841 | A1 * | 7/2002 | Kitayama | .............. | G10H 1/057 365/1 |
| 2002/0101368 | A1 | 8/2002 | Choi et al. | | |
| 2004/0069123 | A1 * | 4/2004 | Becker | ..................... | G10H 1/00 84/612 |
| 2004/0122662 | A1 * | 6/2004 | Crockett | .................. | G10L 21/04 704/200.1 |
| 2004/0196988 | A1 * | 10/2004 | Moulios | ............... | G10H 1/0091 381/119 |
| 2005/0081700 | A1 * | 4/2005 | Kikumoto | ................ | G10H 1/40 84/604 |
| 2007/0033057 | A1 * | 2/2007 | Covell | .................... | G10L 21/04 704/503 |
| 2008/0131075 | A1 * | 6/2008 | Pontual | .................. | H04N 5/783 386/343 |
| 2008/0257133 | A1 * | 10/2008 | Sasaki | .................. | G10H 1/0025 84/604 |
| 2009/0019995 | A1 * | 1/2009 | Miyajima | ............. | G10H 1/0025 84/625 |
| 2009/0272253 | A1 * | 11/2009 | Yamashita | ........... | G10H 1/0025 84/611 |
| 2010/0222906 | A1 * | 9/2010 | Moulios | ................... | G10H 1/40 700/94 |
| 2011/0099021 | A1 * | 4/2011 | Zong | ....................... | G10L 21/04 704/503 |
| 2012/0118127 | A1 * | 5/2012 | Miyajima | ............ | G10H 1/0025 84/612 |

OTHER PUBLICATIONS

Amir, Arnon, et al. "Using audio time scale modification for video browsing." System Sciences, 2000. Proceedings of the 33rd Annual Hawaii International Conference on. IEEE, 2000.*

Paterson, Justin. "Creative Abuse in Time Stretching." Audio Engineering Society Convention 130. Audio Engineering Society, 2011.*

International Search Report mailed Jul. 23, 2013, for International Application No. PCT/JP2013/067566, with English Translation, three pages.

Extended European Search Report dated Nov. 30, 2015, for EP Application No. 13809959.3, twelve pages.

Healy, G. (Apr. 28, 2007). "djay: Music Mixing, Mac Style," MacApper, Retrieved from the Internet: <URL:http://macapper.com/2007/04/28/rdydjay-music-mixing-mac-style/>, retrieved on Sep. 16, 2010, pp. 1-7.

Notification of the First Office Action dated Jul. 1, 2016, for CN Application No. 201380034189.x, with English translation, 11 pages.

Notification of Reasons for Refusal mailed Jan. 10, 2017, for JP Application No. 2013-535171, with English translation, five pages.

* cited by examiner

| STYLE DATA NAME | NO. OF PART WHERE ACCOM. PATTERN DATA IS AUDIO WAVEFORM DATA | LIMIT VALUE (MAGNIFICATION) | | | | PRIORITY ORDER AT THE TIME OF SIMUL. REPRO. | PRESENCE/ABSENCE OF CORRE. MIDI-FORMAT ACCOM. PATTERN DATA |
|---|---|---|---|---|---|---|---|
| | | UPPER LIMIT VALUE | | LOWER LIMIT VALUE | | | |
| | | SINGLE-PART PERFORMANCE | PLURAL-PART PERFORMANCE | SINGLE-PART PERFORMANCE | PLURAL-PART PERFORMANCE | | |
| AAAAA | 15 | 1.4 | 1.2 | 0.6 | 0.8 | 1 | ABSENT |
| | 16 | 1.4 | 1.2 | 0.6 | 0.8 | 1 | ABSENT |
| BBBBB | 15 | 1.6 | 1.4 | 0.4 | 0.6 | 1 | PRESENT |
| | 16 | 1.5 | 1.4 | 0.5 | 0.6 | 2 | PRESENT |
| CCCCC | 14 | 1.4 | 1.2 | 0.6 | 0.8 | 2 | ABSENT |
| | 15 | 1.2 | 1.0 | 0.8 | 1.0 | 3 | PRESENT |
| | 16 | 1.4 | 1.1 | 0.6 | 0.9 | 1 | PRESENT |

F I G. 4

AUTOMATED PERFORMANCE TECHNOLOGY USING AUDIO WAVEFORM DATA

CROSS-REFERENCE TO RELATED APPLICATIONS

This application is a National Phase application under 35 U.S.C. §371 of International Application No. PCT/JP2013/067566 filed Jun. 26, 2013, which claims the priority benefit of Japanese Patent Application No. 2012-142890 filed Jun. 26, 2012, the contents of which are hereby incorporated by reference in their entireties for all intended purposes.

TECHNICAL FIELD

The present invention relates generally to automated or automatic performance technologies or techniques for executing an automatic performance of music (melody and/or accompaniment) using at least audio waveform data, and more particularly a technique for playing back or reproducing tones at a desired performance tempo, without involving undesired tone pitch variation of reproduced tones, by use of time axis expansion/contraction control (i.e., time stretch control)

BACKGROUND ART

There have heretofore been known automatic performance apparatus which prestore accompaniment pattern data indicative of arpeggio patterns, bass patterns, rhythm patterns, etc. each having a predetermined unit length, such as a four-measure length, and which execute an automatic performance of tones on the basis of the accompaniment pattern data. Generally, there are cases in which tone waveform signals obtained by sampling actual musical instrument performances, human voices, natural sounds, etc. for each of performance parts, such as a chord accompaniment part, a bass part and a rhythm part, are used as accompaniment pattern data, and in which tone control signals (i.e., tone generation instruction data like MIDI data defined in accordance with the MIDI standard) are used as accompaniment pattern data.

In the case where audio waveform data is used as the accompaniment pattern data, it is known to perform time stretch control (i.e., time axis expansion/contraction control) in order to generate tones at a desired performance tempo without involving undesired tone pitch variation. As the time stretch control, it is known to time-serially read out the audio waveform data and write the read-out audio waveform data into a RAM and then time-serially read out the thus-written audio waveform data from the RAM at a frequency different from a frequency at which the audio waveform data was written into the RAM. By changing a ratio between the frequency at which the audio waveform data was written into the RAM and the frequency at which the thus-written audio waveform data is read out from the RAM, it is possible to generate tones, different only in performance tempo from the written audio waveform data, with the same tone pitches as when the audio waveform data was written into the RAM (i.e., with the same tone pitches as at the time of audio waveform data recording). Patent Literature 1 identified below discloses an apparatus which performs time stretch control to generate tones while changing only a performance tempo without changing tone pitches.

Throughout this specification, the term "time stretch" is used to refer to compressing audio data on the time axis (i.e., time-axially compressing audio data) and stretching audio data on the time axis (i.e., time-axially stretching audio data). Further, in this specification, the term "tone" is used to refer to a voice or any other sound without being limited to a musical sound alone.

In the case where tone generation instruction data are used as the accompaniment pattern data, on the other hand, generated tones would not change in pitch even if a performance tempo is changed as desired. Namely, in order to change a performance tempo, it just suffices that the automatic performance apparatus change a readout rate of event data (more specifically, note-on event data and note-off event data). For example, the automatic performance apparatus changes the tone performance tempo of tones by changing readout timing of individual event data included in the MIDI data. However, even if the readout timing of the individual event data is changed, information like note numbers (tone pitch information) of the individual event data would stay unchanged and thus tones would not change in pitch.

PRIOR ART LITERATURE

Patent Literature 1: Japanese Patent No. 2970396

However, depending on a designated performance tempo, the known apparatus would give auditorily unnatural impressions. Namely, depending on a designated performance tempo, tones generated based on audio waveform data would considerably lower in sound quality, and there would be caused a difference in generation timing between tones based on audio waveform data and tones based on MIDI data, as well as noise-like sound skipping. A cause for such problems is as follows. In the case where MIDI data is used as accompaniment pattern data, the apparatus can generate tones with no problem in correspondence with a wide range of tempos by only changing readout timing of individual notes as noted above. By contrast, in the case where audio waveform data is used as accompaniment pattern data, a processing load associated with write control for writing the audio waveform data into a RAM and read control for reading out the written audio waveform data from the RAM would increase as the performance tempo gets faster (speeds up), so that processing delays would occur easily as compared to automatic performance control based on MIDI data. If the processing load becomes excessive, freezing of a CPU system would occur, adversely influencing the entire apparatus. For example, when a certain performance part is being automatically performed on the basis of audio waveform data with another performance part automatically performed on the basis of MIDI data, there would be encountered an inconvenience that not only the automatic performance of the performance part based on the audio waveform data but also the automatic performance of the performance part based on the MIDI data is stopped by freezing of the CPU system. Furthermore, when the apparatus is executing other desired applications concurrently with an automatic performance, there tends to be presented another inconvenience that these other applications too are frozen.

Moreover, considerable sound quality deterioration would occur if a difference between a designated performance tempo and a tempo (reference tempo) at which the audio waveform data was recorded, irrespective of whether the designated performance tempo is too fast or too slow. Such sound quality deterioration can occur in waveform control during time stretch control, more specifically when performing jump control of reproduced positions corresponding to the performance tempo to thereby interconnect waveforms corresponding to the reproduced positions immediately before and after the jump. Particularly, when the audio waveform data is being used as the accompaniment pattern data, there is a relatively great possibility of such sound quality deterioration because the designated performance tempo and the reference tempo often greatly differ from each other and thus the reproduced positions immediately before and after the jump often are greatly separated from each other.

SUMMARY OF INVENTION

In view of the foregoing prior art problems, it is an object of the present invention to properly deal with a processing delay and sound quality deterioration that are likely to occur when audio waveform data is reproduced with time axis expansion/contraction control performed on the audio waveform data in accordance with a desired performance tempo.

According to the present invention, there is provided an automatic performance apparatus, which comprises: a storage section storing waveform data of a music performance based on a desired reference tempo; an acquisition section configured to acquire information designating a variable performance tempo; a determination section configured to determine, in accordance with relationship between the performance tempo and the reference tempo, whether reproduction of the waveform data should be limited or not; and an audio reproduction section configured to reproduce the waveform data stored in the storage section, the audio reproduction section performing, in order to reproduce the waveform data in accordance with the performance tempo, time axis expansion/contraction control on the waveform data to be reproduced in accordance with the relationship between the performance tempo and the reference tempo. When the determination section has determined that the reproduction of the waveform data should be limited, the audio reproduction section performs one of an operation for stopping the reproduction of the waveform data and an operation for continuing the reproduction of the waveform data with a resolution of a reproduction process lowered.

In order to reproduce, at the variable performance tempo, the waveform data of the music performance of the desired performance tempo stored in the storage section, the time axis expansion/contraction control on the waveform data to be reproduced is performed in accordance with the relationship between the performance tempo and the reference tempo. According to the present invention, a determination is made, in accordance with the relationship between the performance tempo and the reference tempo, whether the reproduction of the waveform data should be limited or not. When it has been determined that the reproduction of the waveform data should be limited, the audio reproduction section performs one of the operation for stopping the reproduction of the waveform data and the operation for continuing the reproduction of the waveform data with a resolution of a reproduction process lowered. If there is such a gap between the performance tempo and the reference tempo, due to an influence of a processing delay in the time axis expansion/contraction control, that may generate a tone delayed from the performance tempo, that may generate a tone of a low sound quality or that may freeze the processing system, then it is determined that the reproduction of the waveform data should be limited. Limiting the reproduction of the waveform data comprises, for example, stopping reproduction of the waveform data. If the relationship between the performance tempo and the reference tempo is such that the waveform data is reproduced at a performance tempo that may cause a processing delay or sound quality deterioration, the reproduction of the waveform data is stopped, so that it is possible to solve problems, such as generation of a tone delayed from the desired performance tempo, noise-like intermittent sound skipping and generation of a tone having a considerably lower sound quality. Additionally, it is possible to prevent freezing of the processing system and thereby forestall various inconveniences associated with the freezing of the processing system. Alternatively, when it has been determined that the reproduction of the waveform data should be limited, the audio reproduction section performs the operation for continuing the reproduction of the waveform data with the resolution of the reproduction process lowered. For example, lowering the resolution of the reproduction process comprises lowering the resolution of the time axis expansion/contraction control of the waveform data. By thus lowering the resolution of the reproduction process of the waveform data, the present invention can prevent processing delays, i.e. prevent the processing from delaying from a desired performance tempo.

According to such reproduction stop control of the waveform data, where two or more performance parts are reproduced simultaneously, and even when reproduction of any of the performance parts is stopped, it can be expected that, by virtue of presence of the other performance part(s) whose reproduction is not stopped, the automatic performance will not be significantly hindered. For example, when a plurality of tones based on MIDI data are being simultaneously generated, tone generation based on the MIDI data can be continued reliably. Further, the automatic performance apparatus may be constructed in such a manner that, for each of the performance parts and in accordance with a condition defined for the performance part independently of the other performance part(s), a determination is made as to whether the reproduction of the waveform data of the performance part should be limited or not. In such a case, even when the reproduction of the waveform data of any of the performance parts is stopped, the automatic performance can be continued without the reproduction of the waveform data of the other performance part(s) being stopped.

In a preferred implementation, when a predetermined first condition that the performance tempo is too fast as compared to the reference tempo is satisfied, the determination section determines that the reproduction of the waveform data should be limited, and the audio reproduction section performs, in response to the determination based on the first condition by the determination section that the reproduction of the waveform data should be limited, one of the operation for stopping the reproduction of the waveform data and the operation for continuing the reproduction of the waveform data with the resolution of the reproduction process lowered. With such an arrangement, the present invention can properly deal with a performance tempo too fast as compared with the reference tempo and thus likely to cause a processing delay, by stopping the reproduction of the waveform data or by lowering the resolution of the reproduction process.

In a preferred implementation, when a predetermined second condition that the performance tempo is too slow as compared to the reference tempo is satisfied, the determination section determines that the reproduction of the waveform data should be limited, and the audio reproduction section performs, in response to the determination based on the second condition by the determination section that the reproduction of the waveform data should be limited, performs the operation for stopping the reproduction of the waveform data. With such an arrangement, the present invention can properly deal with a performance tempo too slow as compared with the reference tempo and likely to cause sound quality deterioration, by stopping the reproduction of the waveform data.

In a preferred implementation, the automatic performance apparatus of the present invention further comprises a tone generation section configured to generate a tone waveform based on tone generation instruction data, such as data of a MIDI format (MIDI data). In response to the determination by the determination section that the reproduction of the waveform data should be limited, the audio reproduction section performs the operation for reproducing the waveform data, and the tone generation section generates, based on the tone generation instruction data, a tone waveform corresponding to the waveform data whose reproduction should be stopped. Namely, the present invention is arranged to generate a tone waveform based on the tone generation instruction data, such as data of the MIDI format (MIDI data), instead of stopping the reproduction of the waveform data and thereby appropriately substitute for a performance based on the waveform data.

Namely, upon acquisition of such a performance tempo different from the reference tempo by more than a predetermined value that is likely to generate a tone delayed from a desired performance or likely to generate a tone of a low sound quality, the present invention does not generate a tone by daring not read out a tone waveform signal. As a result, the present invention can achieve the advantageous benefit that it can execute a performance giving no auditorily unnatural impression to a user.

The present invention may be constructed and implemented not only as the apparatus invention discussed above but also as a method invention. Also, the present invention may be arranged and implemented as a software program for execution by a processor, such as a computer or DSP, as well as a non-transitory computer-readable storage medium storing such a software program.

BRIEF DESCRIPTION OF DRAWINGS

Now, several preferred embodiments of the present invention will be described hereinbelow merely by way of example with reference to the accompanying drawings, in which:

FIG. 4 is a conceptual diagram showing a data organization of a performance tempo limit value table;

DESCRIPTION OF EMBODIMENTS

Figure 1:
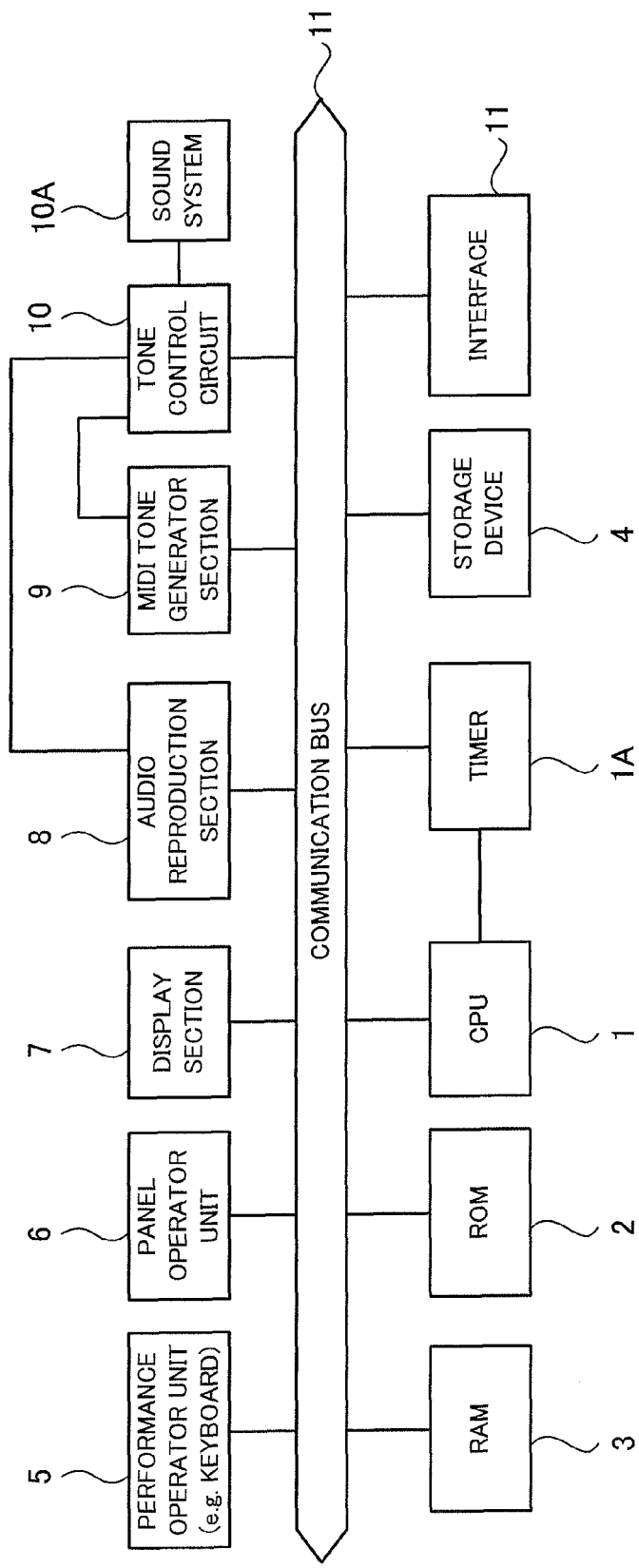
FIG. 1 is a block diagram showing an example hardware setup of an electronic musical instrument to which is applied an embodiment of an automatic performance apparatus of the present invention.

FIG. 1 is a block diagram showing an example hardware setup of an electronic musical instrument to which is applied an embodiment of an automatic performance apparatus of the present invention. In the electronic musical instrument of FIG. 1, various processes are carried out under control of a microcomputer including a microprocessor unit (CPU) 1, a read-only memory (ROM) 2 and a random access memory (RAM) 3. The CPU 1 controls operation of the entire electronic musical instrument. To the CPU 1 are connected, via a data and address bus 1D, the ROM 2, the RAM 3, a storage device 4, a performance operator unit 5, a panel operator unit 6, a display section 7, an audio reproduction section 8, a MIDI tone generator section 9, a tone control circuit 10 and an interface 11.

Also connected to the CPU 1 is a timer 1A for counting various times, for example, to signal interrupt timing for timer interrupt processes. For example, the timer 1A generates tempo clock pulses for setting a performance tempo at which to automatically perform tones, and for setting frequencies at which to temporarily write into the RAM 3 audio data read out time-serially from the storage device 4 and at which to read out from the RAM 3 audio data temporarily written in the RAM 3. Such tempo clock pulses generated by the timer 1A are given to the CPU 1 as processing timing instructions or as interrupt instructions. The CPU 1 carries out various processes in accordance with such instructions.

The ROM 2 stores therein various control programs for execution by the CPU 1 and various data for reference by the CPU 1. The RAM 3 is used as a working memory for temporarily storing various data generated as the CPU 1 executes predetermined programs, as a memory for temporarily storing a currently-executed program and data related to the currently-executed program, and for various other purposes. Predetermined address regions of the RAM 3 are allocated to various functions and used as various registers, flags, tables, temporary memories, etc.

The storage device 4 has a built-in database capable of storing a multiplicity of various data, such as style data including audio waveform data (see FIG. 2) and MIDI data (not shown). The storage device 4 may also store therein various control programs for execution by the CPU 1. In a case where a particular control program is not prestored in the ROM 2, the control program may be prestored in the external storage device (e.g., hard disk device) 4, so that, by reading the control program from the external storage device 4 into the RAM 3, the CPU 1 is allowed to operate in exactly the same way as in the case where the particular control program is prestored in the ROM 2. This arrangement greatly facilitates version upgrade of the control program, addition of a new control program, etc. The storage device 4 may be of any desired type as long as it uses any of various recording media other than the hard disk (HD), such as a flexible disk (FD), compact disk (CD-ROM or CD-RAM), magneto-optical disk (MO) and DVD (digital versatile disk). Alternatively, the storage device 4 may be a semiconductor memory, such as a flash memory.

The performance operator unit 5 is, for example, a keyboard including a plurality of keys operable to select pitches of tones to be generated and key switches provided in corresponding relation to the keys. The performance operator unit 5 is of course usable for a manual performance by a human player, but also usable as an input means for inputting a chord. Needless to say, the performance operator unit 5 may be of any other type than the keyboard type, such as a neck-like type having tone-pitch selecting strings provided thereon.

The panel operator unit 6 includes various operators, such as a selection switch for selecting style data, a tempo setting switch for setting a performance tempo, a reproduction (play)/stop button for instructing start/stop of an automatic performance, an input operator for inputting a chord, setting operators for setting parameters, such as tone colors and effects. Needless to say, the panel operator unit 6 may also include various other operators, such as a numeric keypad and a character (text)-data entering keyboard for selecting, setting and controlling tone pitches, colors, effects, etc., as well as a mouse for operating a pointer that points to a position on various screens displayed on the display section 7.

The display section 7, which comprises a liquid crystal display (LCD) panel, CRT (Cathode Ray Tube) and/or the like, visually displays not only various screens (such as a not-shown style selection screen and a not-shown performance tempo setting screen) but also various information, such as contents of style data, and controlling states of the CPU 1, etc. A human player can readily select style data set a performance tempo etc. by reference to various information displayed on the display section 7.

An audio reproduction section 8 is capable of simultaneously generating reproduced waveform signals of a plurality of tracks (performance parts). Namely, the audio reproduction section 8 generates reproduced waveform signals, performance part by performance part, on the basis of audio waveform data of the individual performance parts included in desired style data given via the data and address bus 1D.

A MIDI tone generator section 9 is capable of simultaneously generating reproduced waveform signals of the plurality of tracks (performance parts). Namely, the MIDI tone generator section 9 receives MIDI data (tone generation instruction data) given via the data and address bus 1D, generates reproduced waveform signals on the basis of various event information included in the MIDI data and outputs the generated reproduced waveform signals. The MIDI tone generator section 9 is implemented by use of a computer, where automatic performance control based on the MIDI data is performed by the computer executing a predetermined application program. Note that the tone generation instruction data may be in any other suitable format than the MIDI format.

The MIDI tone generator section 9 need not necessarily be implemented by a computer program and may be implemented by microprograms processed by a DSP (Digital Signal Processor). Further, the MIDI tone generator section 9 may be implemented by other than such programs, such as a dedicated hardware device having discrete circuits or integrated or large-scale integrated circuit incorporated therein. Further, the MIDI tone generator section 9 may employ any desired tone synthesis method other than the waveform memory method, such as the FM method, physical model method, harmonics synthesis method, formant synthesis method or the like. Any one of such tone synthesis methods may be employed singly, or a desired combination of such tone synthesis methods may be employed.

The above-mentioned audio reproduction section 8 and the MIDI tone generator section 9 are both connected to the tone control circuit 10, and the tone control circuit 10 performs predetermined digital signal processing on reproduced waveform signals generated from the audio reproduction section 8 and the MIDI tone generator section 9 to impart effects to the reproduced waveform signals. Then, the tone control circuit 10 mixes (adds together) the waveform signals and outputs the mixed waveform signal to a sound system 10A including a speaker etc. Namely, the tone control circuit 10 includes a signal mixing (addition) circuit, a D/A converter circuit, a sound volume control circuit, etc.

The interface 11 is an interface for transmitting and receiving (i.e., communicating) various data, such as style data and MIDI, and various information, such as a control program, between the embodiment of the automatic performance apparatus and not-shown other equipment (such as an electronic musical instrument and a server apparatus). The interface 11 may be any one of a MIDI interface, LAN, Internet, telephone line, etc. and may be of either or both of wired and wireless types. For example, style data etc. may be acquired by the user accessing a server apparatus, resident on a communication network, connected with the apparatus via the interface 11.

It should be appreciated that the automatic performance apparatus of the present invention is not limited to the type where all of the performance operator unit 5, display section 7 and MIDI tone generator section 9, etc. are incorporated together within the body of the apparatus, and the automatic performance apparatus may of course be of another type where the above-mentioned performance operator unit 5, display section 7 and MIDI tone generator section 9, etc. are provided separately and interconnected via communication means, such as MIDI interfaces and various communication networks.

It should also be appreciated that the automatic performance apparatus of the present invention may be applied to any other forms of apparatus and equipment etc. than electronic musical instruments as described above, such as personal computers, portable communication terminals, such as PDAs (portable information terminals) and mobile phones, and game apparatus, as long as such apparatus and equipment etc. can execute an automatic performance of tones based at least on audio waveform data.

Figure 2:
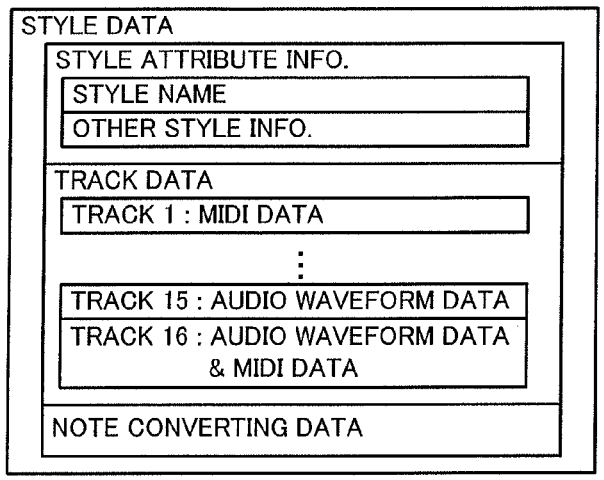
FIG. 2 is a conceptual diagram showing a data organization of style data.

FIG. 2 is a conceptual diagram showing a data organization of style data stored in the database built in the electronic musical instrument. The style data include not only those prestored in the electronic musical instrument (i.e., those created by a manufacturer of the electronic musical instrument), but also those newly created by a user and additionally stored in the database, and those created by the manufacturer and other users, registered in external equipment (e.g., server apparatus) and then stored in the database in place of or in addition to the existing data.

Each of the style data (automatic performance data) includes style attribute information and substantive data (track data and note converting data). The style attribute information, which is information registered in the database and permitting a search as to in what types of music piece and musical genre the accompaniment style in question is suited for use, includes a style name and other style attribute information. The style name is a name unique to the accompaniment style. The other style attribute information includes, for example, actual music piece names matching an image of the accompaniment style, keywords which can bring up an image of the accompaniment style, musical time information, tempo information (recommended tempo, i.e. reference tempo), tone color, etc.

Track data is basic accompaniment pattern data prepared for each of a plurality of sections (intro, main, fill-in, ending, etc.) and for each of a plurality of tracks (chord backing part, bass part, rhythm part, etc.). Either MIDI data comprising a series of MIDI-format events, such as note events and tone generation timing, or audio waveform data obtained by sampling an actual musical instrument performance, human voice, natural sound, etc. may be allocated to a track (as the track data). Alternatively, in the instant embodiment, both audio waveform data and MIDI data may be allocated to a track. Note that the MIDI data is a data pattern capable of generating tones similar to tones generated on the basis of the audio waveform data. These accompaniment pattern data may have lengths in a range of one to a plurality of measures differing among the sections. It should be appreciated that the instant embodiment is not limited to the construction where audio waveform data and/or MIDI data are stored in the style data; namely, storage locations of style data and storage locations of audio waveform data and MIDI data may be different from each other.

MIDI data is data created on the basis of predetermined reference chords and subjected to chord conversion in accordance with each chord designated at the time of a performance. The predetermined reference chords are, for example, various chords each having pitch name "C" as a root note (e.g., C major, C minor and C seventh), and tone pitches in accompaniment pattern data are converted so as to match chords designated as desired during a performance. The chords designated during a performance may be variable, or may be designated in advance in note-converting data in an order of performance progression, or may be input as appropriate by the user during an automatic performance. Note that the note-converting data may include information for setting chord conversion characteristics, such as a table to be used for chord conversion.

Figure 3:
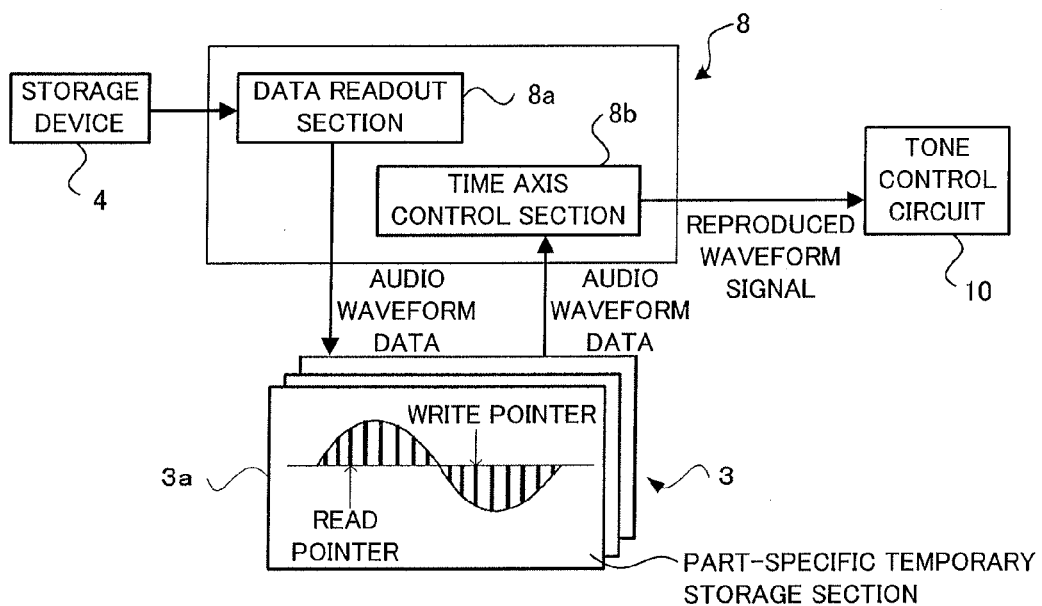
FIG. 3 is a functional block diagram explanatory of functions of an audio reproduction section.

The following describe generation, by the audio reproduction section 8, of reproduced waveform signals. FIG. 3 is a functional block diagram explanatory of functions of the audio reproduction section 8, where arrows indicate flows of data.

As shown in FIG. 3, the audio reproduction section 8 includes a data readout section 8a and a time axis control section 8b. The data readout section 8a reads out, part by part (i.e., track by track), audio waveform data included in style data selected from among various style data stored in the storage device 4, ROM 2 or the like and writes (transfers) the read-out audio waveform data into part-specific temporary storage sections 3a provided in the RAM 3 or the like. At that time, once audio waveform data of a single performance pattern is read out to the end from the storage device 4, the audio reproduction section 8 returns to the beginning of the audio waveform data of the single performance pattern to repeat the readout of the audio waveform data. Note, however, that, upon designation of a performance tempo which increases a load associated with write control for writing the audio waveform data into the temporary storage sections 3a (audio waveform data write control) and read control for reading out the written audio waveform data from the temporary storage sections 3a (audio waveform data read control) or a performance tempo which increases sound quality deterioration, i.e. upon designation of a performance tempo greatly different from a recommended tempo (reference tempo), the data readout section 8a stops writing (transferring) the audio waveform data to the temporary storage sections 3a. Note that, typically, the audio waveform data stored in the storage device 4 or the like is data stored after being obtained from a musical instrument performance executed for a desired performance part at a desired tempo. The performance tempo of the thus-stored audio waveform data will hereinafter be referred to as "recommended tempo" or "reference tempo".

The temporary storage section 3a is constructed, for example, as a so-called FIFO (First-In/First-Out) buffer memory in which an empty storage region increases in size as the written audio waveform data is read out in chronological order. In such a buffer memory, a data write pointer for pointing to an address in which data is to be written and a data read pointer for pointing to an address from which data is to be read can be controlled in an asynchronous fashion. Thus, data write and data readout can be processed simultaneously or concurrently in a parallel fashion with data write speed and data readout speed differentiated from each other.

The time axis control section 8b reads out the audio waveform data, written in the temporary storage section 3a, in accordance with a given frequency. At that time, by changing a ratio between data write speed (frequency) and data readout speed (frequency), it is possible to make time-axis arrangement for reducing or increasing a reproduction time length, without changing tone pitches of the original audio waveform data. Thinning of the audio waveform data is performed to reduce the reproduction time length, while interpolation of the audio waveform data is performed to increase the reproduction time length. For example, when the user has instructed a change of a reproduced performance tempo, time stretch control is performed on the audio waveform data in accordance with the instructed tempo. There have heretofore been proposed various methods for performing time stretch control to contract (compress) or stretch (expand) the time axis through such waveform control without changing tone pitches. However, because such time stretch control is known per se, detailed description of the time stretch control is omitted here. Reproduced waveform signals generated part by part from the time axis control section 8b are output to the tone control circuit 10.

In the instant embodiment, the CPU 1 controls the data readout section 8a to stop audio waveform data readout under a predetermined condition. If the audio waveform data readout, by the data readout section 8a, from the storage device 4 or the like is stopped, no more audio waveform data is written into the temporary storage section 3a. The predetermined condition under which the audio waveform data readout from the storage device 4 or the like is stopped is prestored in a performance tempo limit value table provided in advance. Thus, the following describe the performance tempo limit value table. FIG. 4 is a conceptual diagram showing a data organization in the performance tempo limit value table.

As shown in FIG. 4, the performance tempo limit value table has stored therein, for each style data indicated by a style name, a part number of a performance part whose accompaniment pattern data is audio waveform data, limit values (magnifications) of a performance tempo, priority order at the time of simultaneous reproduction, and presence/absence of corresponding MIDI data. The "part number of a performance part whose accompaniment pattern data is audio waveform data" indicates a performance part No. (track No.) to which audio waveform data is allocated as accompaniment pattern data from among a plurality of performance parts included in the style data indicated by the style name.

The performance tempo limit values indicate, by upper and lower limit values, tempo limit values within which an automatic performance of tones would not be hindered due to a processing delay of the time stretch control and within which no problem would occur auditorily in sound quality. In the illustrated embodiment, the performance tempo limit values may be indicated, for example, as magnifications (or differences) relative to the recommended tempo (recommended performance tempo). For example, if a performance tempo exceeding the upper limit value is set, it is considered that the automatic performance will be hindered due to a delay of the time stretch control resulting from a great processing load associated with audio waveform data write control and read control performed via the temporary storage section 3a. If a performance tempo falling below the lower limit value is set, on the other hand, it is considered that waveform connection deterioration will become considerable due to adjustment (jumping) of waveform positions read out in the time stretch control. Namely, these upper and lower limit values are threshold values that may influence waveform control associated with the time stretch control to thereby generate a tone delayed from the acquired performance tempo or a tone of a low sound quality. Further, the performance tempo limit values defined by the upper and lower limit values include "limit values for single-part automatic performance" and "limit values for plural-part automatic performance". The "limit values for single-part automatic performance" is employed when a single performance part where the accompaniment pattern data is audio waveform data is automatically performed alone, while the "limit values for plural-part automatic performance" is employed when a plurality of performance parts where the accompaniment pattern data is audio waveform data are automatically performed simultaneously, i.e. when a processing load for the time stretch control is great by nature as compared to the single-part automatic performance.

Further, in a case where a plurality of performance parts where the accompaniment pattern data is audio waveform data are to be automatically performed, the "priority order at the time of simultaneous reproduction" indicates an order of the performance parts in accordance with which any of the performance parts is to be set as an object for which the audio waveform data readout is stopped so as not to generate any reproduced waveform signal when it is determined that a performance tempo faster than a limit value (i.e., upper limit value) for plural-part automatic performance has been set or a performance tempo slower than a limit value (lower limit value) for plural-part automatic performance has been set. For example, if a fast performance tempo exceeding a limit value (upper limit value) of "1.4" for plural-part automatic performance has been set at the time of an automatic performance based on style data of style name "BBBB" shown in FIG. 4, no reproduced waveform signal of performance part No. "16" at priority rank "2" is generated. Further, if a fast performance tempo exceeding a limit value (upper limit value) of "1.0" for plural-part automatic performance has been set at the time of an automatic performance based on style data of style name "CCCC", no reproduced waveform signal of performance part No. "15" at priority rank "3" is generated. Furthermore, if a fast performance tempo exceeding a limit value (upper limit value) of "1.1" for plural-part automatic performance has been set, no reproduced waveform signal of performance part No. "14" at rank "2" is generated even though the limit value "1.1" does not exceed the limit value (upper limit value) "1.4". Note that, if a slow performance tempo has been instructed, a determination may be made in a manner to the aforementioned with reference to limit values (lower limit values) for plural-part automatic performance.

The presence/absence of corresponding MIDI data indicates whether or not MIDI data for realizing an accompaniment corresponding to audio waveform data is allocated, in addition to the audio waveform data, as the accompaniment pattern data. If such corresponding MIDI data is "present", it means that two accompaniment pattern data comprising audio waveform data and MIDI data are allocated to the performance part, in which case, if a performance tempo exceeding a limit value has been instructed, tones can be generated on the basis of the MIDI data rather than the audio waveform data. Note that, in a case where MIDI data corresponding to the audio waveform data is allocated, the human player may set as appropriate "present" or "absent" of MIDI data.

Referring back to FIG. 3, a main reason why a processing load increases due to a performance tempo change during reproduction of a tone based on audio waveform data is that a processing load associated with the time stretch control increases as the performance tempo gets faster. More specifically, the processing load increases in response to increase of a write rate and quantity in which audio waveform data is written into the temporary storage section 3a and a rear rate and quantity in which the written audio waveform data is read out from the temporary storage section 3a.

Therefore, according to one embodiment of the present invention, when it is determined that the performance tempo has reached a tempo-speed-up limit based on a limit value of a performance tempo (tempo limit value) (see FIG. 4), reproduction of audio waveform data is stopped. Namely, this embodiment is arranged to reduce the processing load, for example, by preventing the data readout section 8a from reading out audio waveform data from the storage device 4 or the like so that new audio waveform data is not written into the temporary storage section 3a (i.e., writing of new audio waveform data is inhibited). Namely, it can be said that each upper limit value of the aforementioned performance tempo limit values is indicative of a limit of a performance tempo at which the processing load associated with write control for writing, into the temporary storage section 3a, of audio waveform data and read control for reading out, from the temporary storage section 3a, of the written audio waveform data can fall within a load range that does not hinder generation of a reproduced waveform signal.

During stoppage of the readout, from the storage device 4 or the like, of audio waveform data, the data write pointer pointing to an address into which data is to be written is stopped, but the data readout pointer pointing to an address from which data is to be read out is left moving without being stopped. Note, however, that, although the data readout pointer is left moving, no data readout is performed; instead, a silent reproduced waveform signal is generated and output. Namely, a reproduced waveform signal of a silent sound is generated and output because noise would be undesirably generated if nothing is output during the stoppage of the readout of the audio waveform data. Note that, in the case where corresponding MIDI data is "present" in the performance tempo limit value table (see FIG. 4), subsequent tones are generated on the basis of the corresponding MIDI data, following a tone to be substantially muted in response to stoppage of generation of the reproduced waveform signal.

When the performance tempo has reached a tempo limit value, a tone in question is immediately brought into a muted state so that noise sound like "snap !" would occur.

Because such noise sound is auditorily unpreferable, the tone control circuit 10 performs fade-out control on the tone in question. On the other hand, once the muted state is canceled, the tone control circuit 10 performs fade-in control on a tone in question. Time to be spent on such fade-out control and fade-in control can be set at time that does not depend on a designated performance tempo. If the time to be spent on the fade-out control is represented by "t1" and the time to be spent on the fade-in control is represented by "t2", and as the time "t1" is set to a fixed time like "5 ms" on the output side of the time axis control section 8b, the time "t2" too is set to a fixed time. Although the fixed time can improve sound quality, it is likely that an amount of input to the time axis control section 8b varies rapidly and the load extremely increases depending on the performance tempo. To avoid such inconveniences, there may be employed an approach in accordance with which, for time stretch control on the input side of the time axis control section 8b, fade-out control is performed by using audio waveform data having been stored in the temporary storage section 3a till a time point at which readout of audio waveform data from the storage device 4 or the like has been stopped. However, the time to be spent on the fade-out control/fade-in control may be changed depending on the performance tempo, without employing the aforementioned approach.

Figure 5:
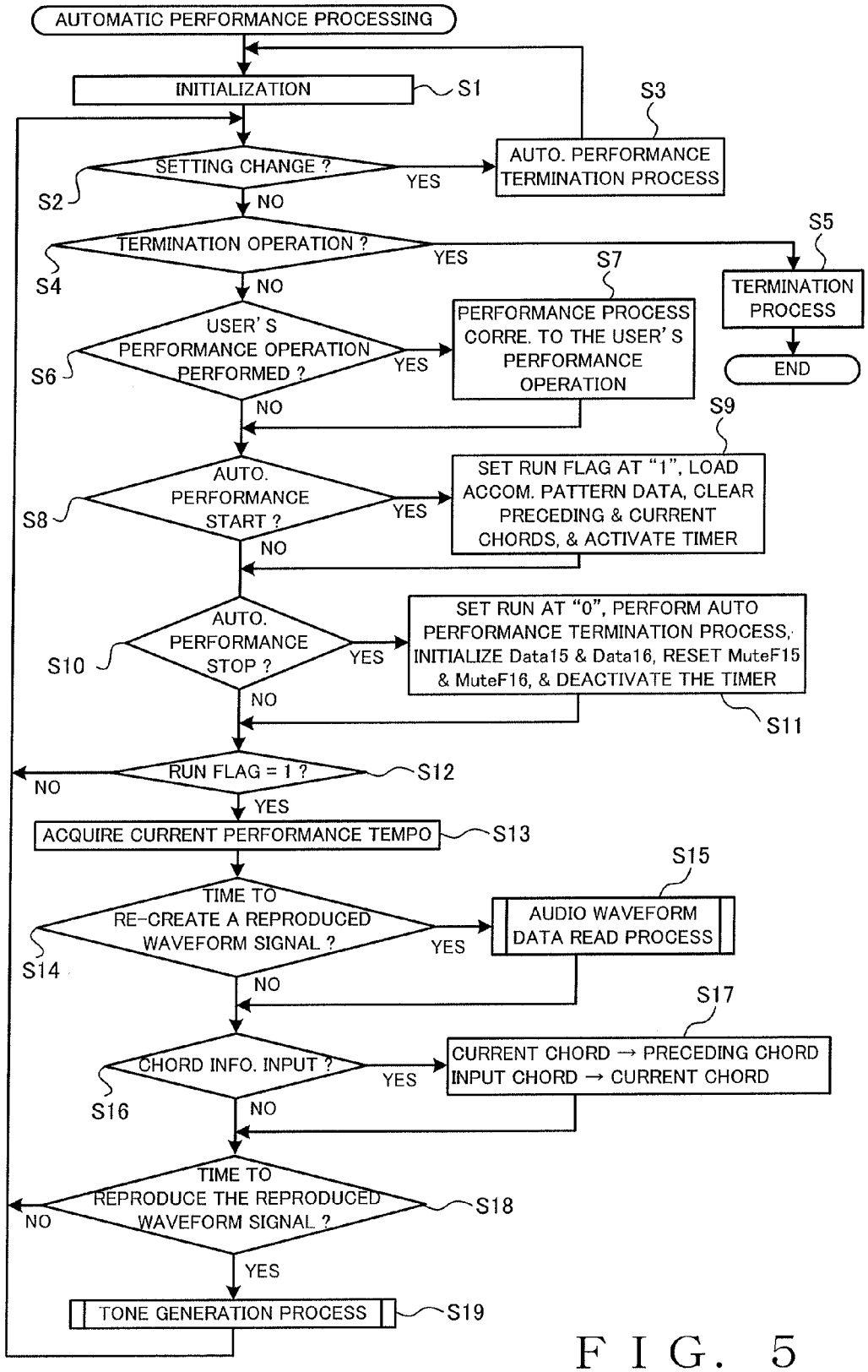
FIG. 5 is a flow chart of an example of automatic performance processing.

Next, a description will be given about "automatic performance processing" performed by the CPU 1. FIG. 5 is a flow chart showing an example of the automatic performance processing. The automatic performance processing is started upon powering-on of the electronic musical instrument and terminated upon powering-off of the electronic musical instrument. To ease understanding of the following description, let it be assumed that no section change and no style data change is made during an automatic performance. Further, let it also be assumed that performance parts which use audio waveform data as accompaniment pattern data are rhythm parts where no pitch conversion need be performed in response to input of a chord, and that these rhythm parts are assigned track Nos. "15" and "16", respectively. To the performance parts other than the rhythm parts are allocated MIDI data as the accompaniment pattern data. In this case, two temporary storage sections 3a (shown as Data15 and Data16) and mute flags (shown as MuteF15 and MuteF16) are secured. The following description will be given primarily in relation to a case where a tempo speed-up has been effected.

At step S1, initialization is performed. Examples of the initialization include: selection of style data; setting of a chord information input method; setting of an initial tempo; initialization of the temporary storage sections 3a (Data15 and Data16); resetting of respective data write pointers (that may be a common data write pointer) and data read pointers of the temporary storage sections 3a; resetting (to zero "0") of the mute flags (shown as MuteF15 and MuteF16); resetting (to zero "0") of an automatic performance flag (hereinafter referred to as "RUN flag"); and initialization of registers for storing a current chord and a preceding (or last) chord.

At next step S2, a determination is made as to whether or not there has been made any setting change related to an automatic performance, such as a style data change, a chord information input method change or an initial tempo change. If any setting change has been made as determined at step S2 (YES determination at step S2), an automatic performance termination process is performance at step S3. In the automatic performance termination process of step S3, the CPU 1 performs various operations, such as for stopping the timer, resetting the RUN flag and deadening all tones being currently generated. After that, the CPU 1 reverts to step S1. If no setting change has been made (NO determination at step S2), a further determination is made as to whether any termination operation, such as operations for turning-off of the power supply, has been performed (step S4).

If any termination operation has been performed as determined at step S4 (YES determination at step S4), the CPU 1 terminates the instant automatic performance processing after having performed a termination process at step S5. In the termination process, the CPU 1 performs various operations, such as operations for deactivating the timer and deadening all tones being currently generated. If, on the other hand, no termination operation has been performed as determined at step S4 (NO determination at step S4), a further determination is made as to whether a user's performance operation or manual performance operation, such as a keyboard operation by the human player, has been performed (step S6). If a user's performance operation has been performed as determined at step S6 (YES determination at step S6), the CPU 1 performs a performance process, such as generation or deadening of a tone corresponding to the performance operation, at step S7 and then proceeds to step S8. Thus, a manual performance tone corresponding to the human player's performance operation can be reflected in the automatic performance. If no user's performance operation has been performed as determined at step S6 (NO determination at step S6), the CPU 1 moves on to step S8 without performing the performance process of step S7.

Further, at step S8, a determination is made as to whether an automatic performance start instruction has been received or not. If such an automatic performance start instruction has been received as determined at step S8 (YES determination at step S8), the RUN flag is set at "1", and then the CPU 1 proceeds to step S10 after performing various operations, such as operations for reading out (loading) selected style data, resetting the preceding and current chords and activating the timer (step S9). If no such an automatic performance start instruction has been received as determined at step S8 (NO determination at step S8), the CPU 1 proceeds to step S10 without performing step S9.

At step S10, a determination is made as to whether an automatic performance stop instruction has been received or not. If such an automatic performance stop instruction has been received as determined at step S10 (YES determination at step S10), the CPU 1 proceeds to step S12 after performing various operations, such as operations for resetting the RUN flag at "0", initializing the temporary storage sections 3a (Data15 and Data16), resetting the mute flags (MuteF15 and MuteF16) and deactivating the timer (step S11). If no such an automatic performance stop instruction has been received as determined at step S10 (NO determination at step S10), on the other hand, the CPU 1 proceeds to step S12 without performing step S11.

At step S12, a determination is made as to whether the RUN flag is currently set at "1". If the RUN flag is not currently set at "1" as determined at step S12 (NO determination at step S12), the CPU reverts to step S2. If the RUN flag is currently set at "1" as determined at step S12 (YES determination at step S12), the CPU 1 acquires current performance tempo information that is currently set for the automatic performance (step S13). Then, a further determination is made, at step S14, whether or not it is now time (timing) to re-generate (i.e., re-create) a reproduced waveform signal in accordance with a change in the current performance tempo information or the like. If it is now time (timing) to re-generate (i.e., re-create) the reproduced waveform signal as determined at step S14 (YES determination at step S14), the CPU 1 proceeds to step S16 after performing an "audio waveform data read process" at step S15. The audio waveform data read process will be described later with reference to FIG. 6. If, on the other hand, it is now not such time to re-generate (i.e., re-create) the reproduced waveform signal as determined at step S14 (NO determination at step S14), the CPU 1 proceeds to step S16 without performing step S15.

At step S16, a further determination is made as to whether input chord information (chord information) has been received. An input style of the chord information is determined by the initially set method for inputting chord information (see step S1). For example, chord information is input as needed in response to a chord input operation, by the human player, in a predetermined key range, direct input of a chord name or an operation for designating a predetermined number associated in advance with a chord. Upon determination that input of chord information has been received (YES determination at step S16), the CPU 1 sets the current chord as the preceding chord and sets the input chord information as the current chord at step S17. Here, when chord information is input for the first time, the preceding chord becomes "none" (no chord). After that, the CPU 1 proceeds to step S18. If, on the other hand, input of chord information has not been received as determined at step S16 (NO determination at step S16), the CPU 1 proceeds to step S18 without performing step S17. Input of chord information may be effected by sequentially reading out a series of chords (chord progression), prepared in advance, in accordance with a performance tempo, or by inputting chords automatically detected on the basis of a performance, by the human player, of a melody or the like.

At step S18, a determination is made as to whether it is now time (timing) to reproduce a reproduced waveform signal generated on the basis of accompaniment pattern data. If it is now not time (timing) to reproduce a reproduced waveform signal as determined at step S18 (NO determination at step S18), the CPU 1 reverts to step S2. If, on the other hand, it is now time to reproduce a reproduced waveform signal as determined at step S18 (YES determination at step S18), the CPU 1 reverts to step S2 after performing a "tone generation process" at step S19. Details of the tone generation process will be discussed later with reference to FIG. 10.

The following describe, with reference to FIGS. 6 to 9, the "audio waveform data read process" (see step S15 of FIG. 5). FIGS. 6 to 9 are a flow chart showing an example of the audio waveform data read process. Note, however, that the audio waveform data read process is shown as divided in four sections for convenience of illustration.

Figure 6:
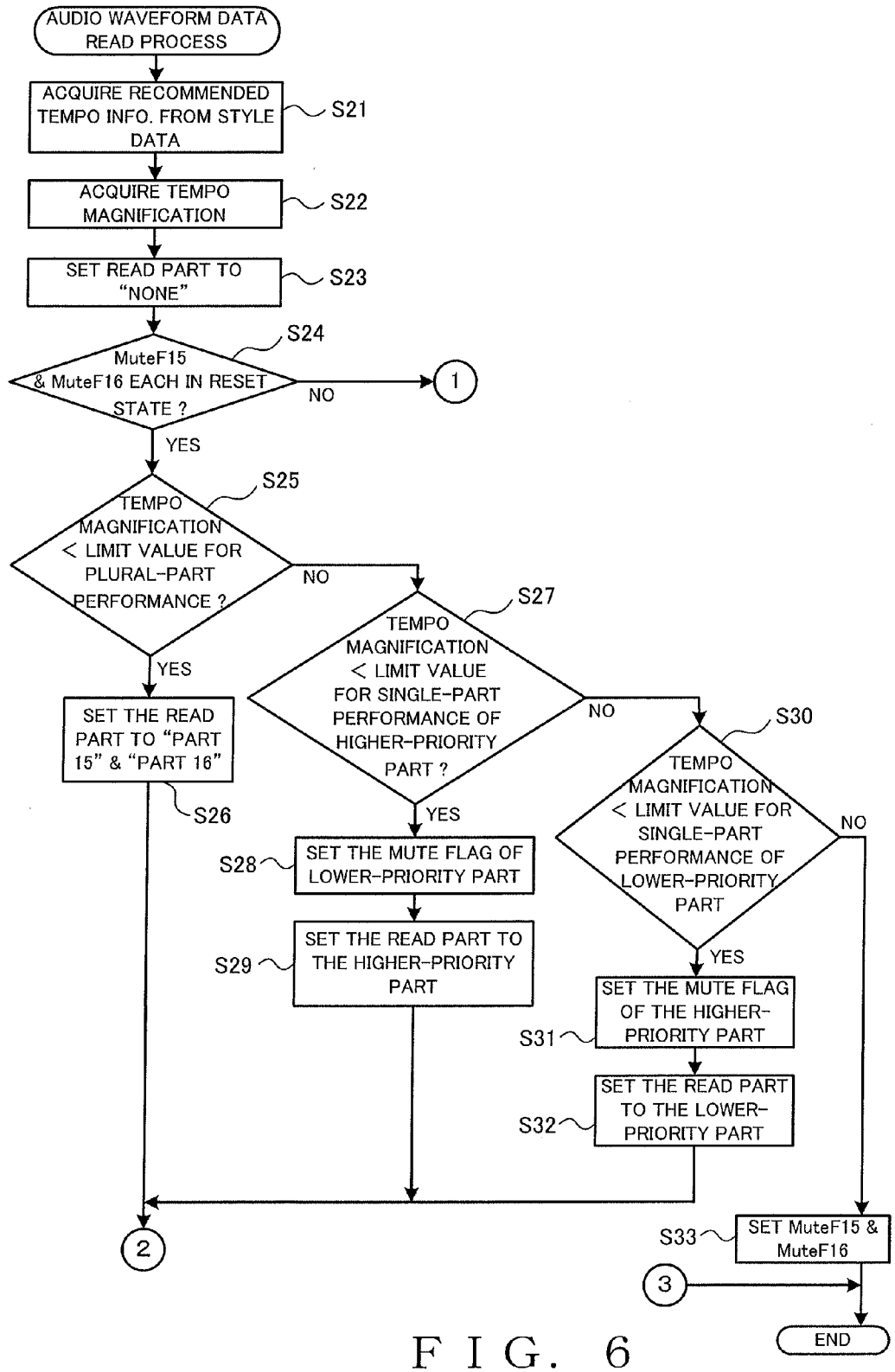
FIG. 6 is a flow chart showing a portion of an example of an audio waveform data read process.

As shown in FIG. 6, recommended tempo (reference tempo) information is acquired from read-out style data at step S21. At next step S22, a tempo magnification is acquired at step S22. The tempo magnification is acquired by calculating a magnification (ratio) of a current tempo to the recommended tempo information. At step S23, a read performance part is set to "none". At next step S24, a determination is made as to whether the mute flags (MuteF15 and MuteF16) are each currently in a reset state (i.e., at the value "0"). If at least one of the mute flags (MuteF15 and MuteF16) is not in the reset state as determined at step S24 (NO determination at step S24), the CPU 1 jumps to step S41 shown in FIG. 7. If the mute flags (MuteF15 and MuteF16) are each currently in the reset state as determined at step S24 (YES determination at step S24), a further determination is made, at step S25, as to whether the tempo magnification is smaller than the limit value (upper limit value in this case) for plural-part automatic performance of each of the "part 15" and "part 16". Comparison between the tempo magnification and the individual limit values is made on the basis of the performance tempo limit value table shown in FIG. 4. If the tempo magnification is smaller than the limit value for plural-part automatic performance of each of the "part 15" and "part 16" as determined at step S25 (YES determination at step S25), the read performance part is set to "part 15" and "part 16" at step S26, after which the CPU 1 proceeds to step S34 of FIG. 9.

If, on the other hand, the tempo magnification is not smaller than the limit value for plural-part automatic performance of each of the "part 15" and "part 16" as determined at step S25 (NO determination at step S25), a further determination is made, at step S27, as to whether the tempo magnification is smaller than the limit value for single-part automatic performance of one of the "part 15" and "part 16" having a higher priority than the other. If the tempo magnification is smaller than the limit value for single-part automatic performance of one of the "part 15" and "part 16" having a higher priority than the other as determined at step S27 (YES determination at step S27), the mute flag of the lower-priority part is set at "1" at step S28, but also the read part is set to the higher-priority part at step S29. After that, the CPU 1 proceeds to step S34 of FIG. 9.

If, on the other hand, the tempo magnification is not smaller than the limit value for single-part automatic performance of one of the "part 15" and "part 16" having a higher priority than the other as determined at step S27 (NO determination at step S27), a further determination is made, at step S30, as to whether the tempo magnification is smaller than the limit value for single-part automatic performance of one of the "part 15" and "part 16" having a lower priority than the other. If the tempo magnification is smaller than the limit value for single-part automatic performance of one of the "part 15" and "part 16" having a lower priority than the other as determined at step S30 (YES determination at step S30), the mute flag of the higher-priority part is set at "1" at step S31, but also the read part is set to the lower-priority part at step S32. After that, the CPU 1 proceeds to step S34 of FIG. 9. If the tempo magnification is not smaller than the limit value for single-part automatic performance of one of the "part 15" and "part 16" having a lower priority than the other as determined at step S30 (NO determination at step S30), the mute flags (MuteF15 and MuteF16) are each set at "1" at step S33, after which the CPU 1 terminates the instant audio waveform data read process.

Figure 7:
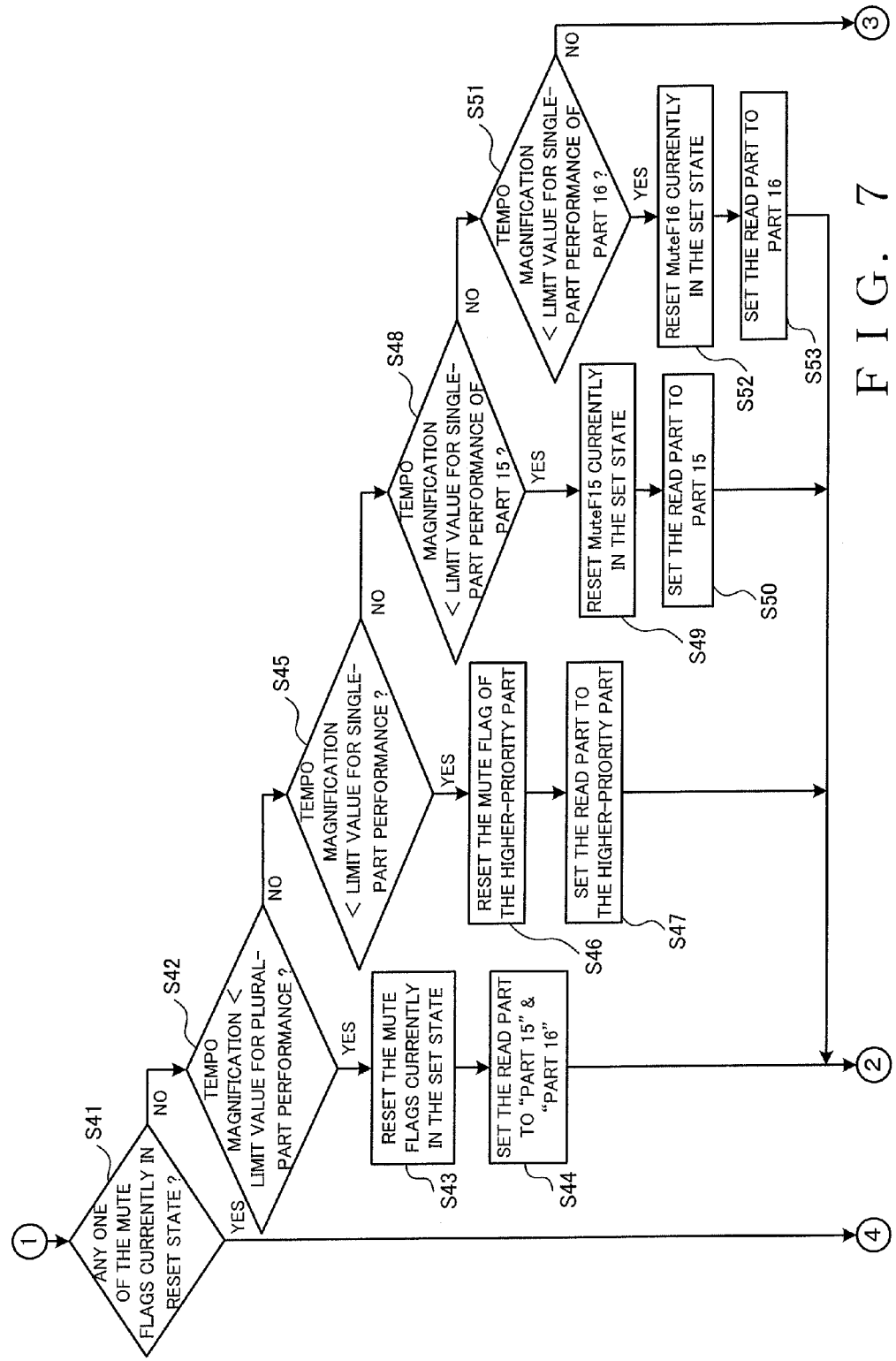
FIG. 7 is a flow chart showing a portion of the audio data read process that follows the portion shown in FIG. 6.

At step S41, as shown in FIG. 7, a determination is made as to whether any one of the mute flags (MuteF15 and MuteF16) is currently in the reset state (at the value "0"). If any one of the mute flags is in the reset state as determined at step S41 (YES determination at step S41), the CPU 1 goes to step S54 of FIG. 8.

If both of the mute flags are currently in the set state (NO determination at step S41), a further determination is made, at step S42, as to whether the tempo magnification is smaller than the limit value for plural-part automatic performance of each of "part 15" and "part 16". If the tempo magnification is smaller than the limit value for plural-part automatic performance of each of "part 15" and "part 16" as determined at step S42 (YES determination at step S42), the mute flags (MuteF15 and MuteF16) are reset (brought into the reset state) at step S43 and the read part is set to "part 15" and "part 16" at step S44, after which the CPU 1 reverts to step S34 shown in FIG. 9.

Further, if the tempo magnification is not smaller than the limit value for plural-part automatic performance of each of "part 15" and "part 16" as determined at step S42 (NO determination at step S42), a further determination is made, at step S45, as to whether the tempo magnification is smaller than the limit value for single-part automatic performance of each of "part 15" and "part 16". If the tempo magnification is smaller than the limit value for single-part automatic performance of each of the "part 15" and "part 16" as determined at step S45 (YES determination at step S45), the mute flag for one of the "part 15" and "part 16" having a higher priority than the other is reset at step S46 and the read part is set to the higher-priority part at step S47, after which the CPU 1 goes to step S34 shown in FIG. 9.

If the tempo magnification is not smaller than the limit value for single-part automatic performance of each of the "part 15" and "part 16" as determined at step S45 (NO determination at step S45), a further determination is made, at step S48, as to whether the tempo magnification is smaller than the limit value for single-part automatic performance of the "part 15". If the tempo magnification is smaller than the limit value for single-part automatic performance of the "part 15" as determined at step S48 (YES determination at step S48), the mute flag MuteF15 currently in the set state is reset at step S49 and the read part is set to the "part 15" at step S50, after which the CPU 1 goes to step S34 shown in FIG. 9.

If the tempo magnification is not smaller than the limit value for single-part automatic performance of the "part 15" as determined at step S48 (NO determination at step S48), a further determination is made, at step S51, as to whether the tempo magnification is smaller than the limit value for the single-part automatic performance of the "part 16". If the tempo magnification is smaller than the limit value for single-part automatic performance of the "part 16" as determined at step S51 (YES determination at step S51), the mute flag MuteF16 currently in the set state is reset at step S52 and the read part is set to the "part 16" at step S53, after which the CPU 1 goes to step S34 shown in FIG. 9. If the tempo magnification is not smaller than the limit value for single-part automatic performance of the "part 16" as determined at step S51 (NO determination at step S51), the CPU 1 terminates the instant processing.

Figure 8:
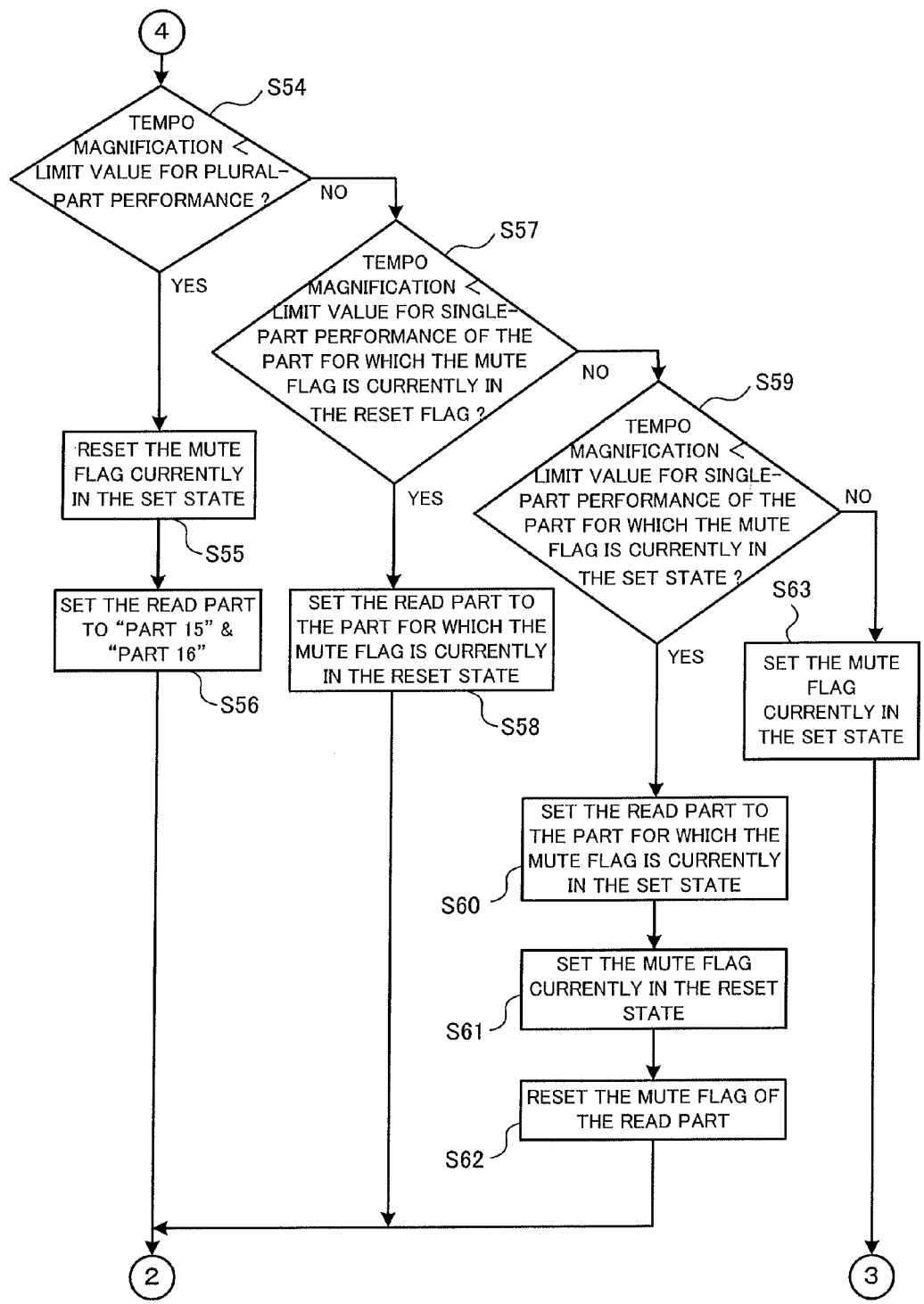
FIG. 8 is a flow chart showing a portion of the audio data read process that follows the portion shown in FIG. 7.

At step S54, as shown in FIG. 8, a determination is made as to whether the tempo magnification is smaller than the limit value for plural-part automatic performance of each of the "part 15" and "part 16". If the tempo magnification is smaller than the limit value for plural-part automatic performance of each of "part 15" and "part 16" as determined at step S54 (YES determination at step S54), one of the mute flags (MuteF15 and MuteF16) currently in the set state is reset at step S55 so that each of MuteF15 and MuteF16 are brought into the reset state, and the read part is set to the "part 15" and "part 16" at step S56, after which the CPU 1 reverts to step S34 shown in FIG. 9.

If the tempo magnification is not smaller than the limit value for plural-part automatic performance of each of the "part 15" and "part 16" as determined at step S54 (NO determination at step S54), a further determination is made, at step S57, whether the tempo magnification is smaller than the limit value for single-part automatic performance of any one of the "part 15" and "part 16" for which the mute flag is currently in the reset state. If the tempo magnification is smaller than the limit value for single-part automatic performance of any one of the "part 15" and "part 16" for which the mute flag is currently in the reset state (YES determination at step S57), the read part is set, at step S58, to the part for which the mute flag is currently in the reset state, after which the CPU 1 reverts to step S34 shown in FIG. 9.

If the tempo magnification is not smaller than the limit value for single-part automatic performance of any one of the "part 15" and "part 16" for which the mute flag is currently in the reset state (NO determination at step S57), a further determination is made, at step S59, whether the tempo magnification is smaller than the limit value for single-part automatic performance of any one of the "part 15" and "part 16" (i.e., "part 15" or "part 16") for which the mute flag is currently in the set state. If the tempo magnification is smaller than the limit value for single-part automatic performance of any one of the "part 15" and "part 16" for which the mute flag is currently in the set state (YES determination at step S59), the read part is set, at step S60, to the part for which the mute flag is currently in the set state, the mute flag currently in the reset state is set at step S61, and the mute flag of the read part is reset at step S62. After that, the CPU 1 reverts to step S34 shown in FIG. 9. If, on the other hand, the tempo magnification is not smaller than the limit value for single-part automatic performance of any one of the "part 15" and "part 16" for which the mute flag is currently in the set state (NO determination at step S59), the mute flag currently in the reset state is set at step S63, after which the CPU 1 terminates the instant audio waveform data read process.

Figure 9:
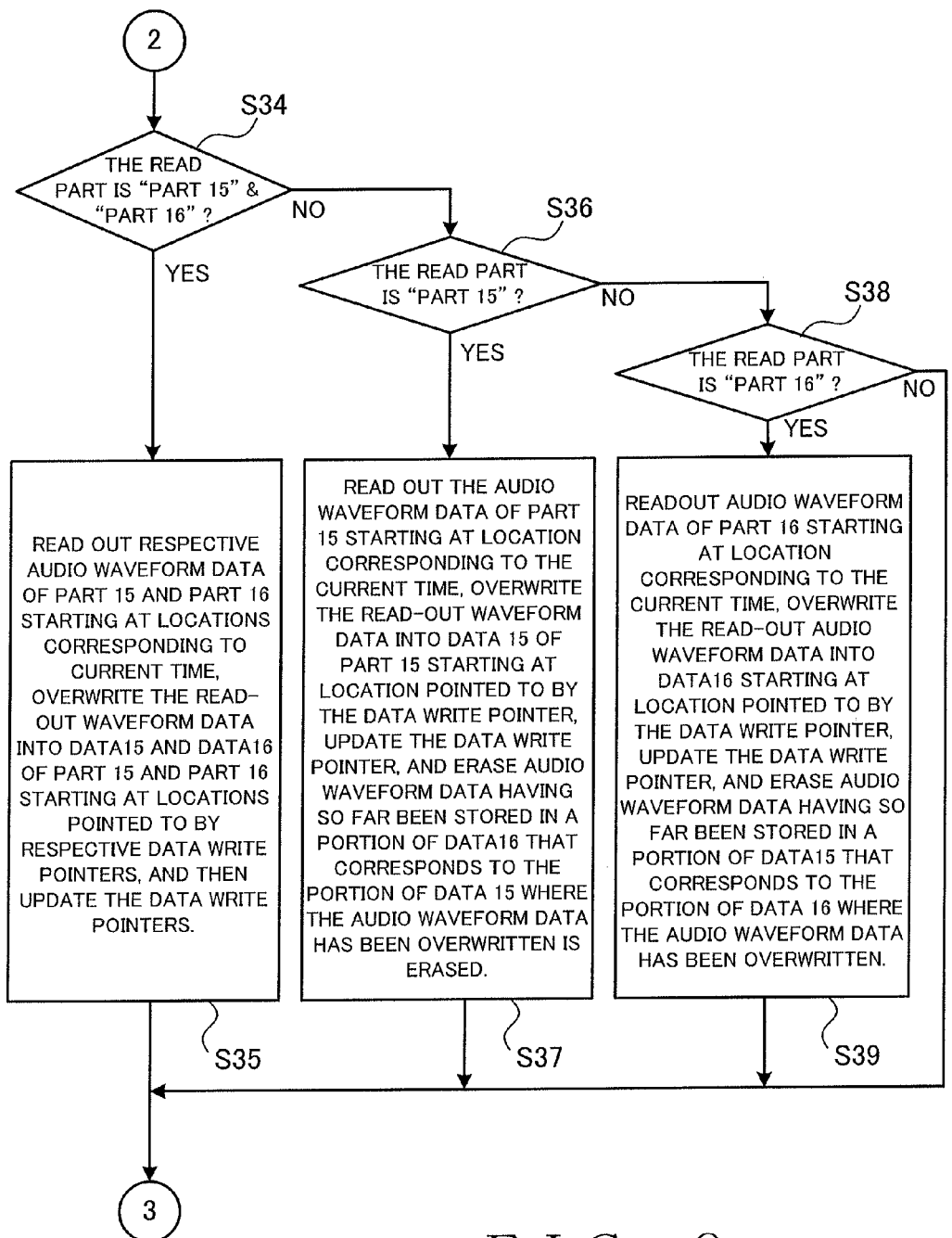
FIG. 9 is a flow chart showing the remaining portion of the audio data read process that follows the portion shown in FIG. 8.

At step S34, as shown in FIG. 9, a determination is made as to whether the "part 15" and "part 16" are currently set as the read part. If the "part 15" and "part 16" are currently set as the read part as determined at step S34 (YES determination at step S34), respective waveform data of the "part 15" and "part 16" are read out from the storage device 4 or the like, starting at locations corresponding to a current time. The thus-read-out waveform data are overwritten into the respective storage sections 3a (Data15 and Data16) of the "part 15" and "part 16", starting at storage locations pointed to by respective data write pointers, and the respective data write pointers are updated at step S35. After that, the CPU 1 terminates the instant audio waveform data read process.

If the "part 15" and "part 16" are not currently set as the read part as determined at step S34 (NO determination at step S34), a further determination is made, at step S36, as to whether the "part 15" is currently set as the read part. If the "part 15" is currently set as the read part as determined at step S36 (YES determination at step S36), the waveform data of the "part 15" is read out from the storage device 4 or the like, starting at a location corresponding to the current time. The thus-read-out waveform data is overwritten into the temporary storage section 3a (Data15) of the "part 15", starting at a storage location pointed to by the data write pointer, and the data write pointer is updated at step S37. Namely, the data write pointer, shared with the temporary storage section (Data16) of the "part 16", is updated in response to the audio waveform data writing to the temporary storage section 3a (Data15). At that time, the audio waveform data readout from the storage device 4 or the like is stopped so that the audio waveform data writing into the temporary storage section (Data16) of the "part 16" is stopped, and thus, audio waveform data having so far been stored in a portion of the temporary storage section (Data16) that corresponds to the portion of the temporary storage section (Data15) where the audio waveform data has been overwritten is erased. After that, the CPU 1 terminates the instant audio waveform data read process.

If the "part 15" is not currently set as the read part as determined at step S36 (NO determination at step S36), a further determination is made, at step S38, as to whether "part 16" is currently set as the read part. If "part 16" is not currently set as the read part as determined at step S38 (NO determination at step S38), the CPU 1 terminates the instant audio waveform data read process.

If, on the other hand, the "part 16" is currently set as the read part as determined at step S38 (YES determination at step S38), audio waveform data of the "part 16" is read out from the storage device 4 or the like, starting at a location corresponding to the current time, and the read-out audio waveform data is overwritten into the temporary storage section (Data16) of the "part 16", starting at a storage location pointed to by the data write pointer of the temporary storage section (Data16), and the data write pointer of the temporary storage section (Data16) is updated (step S39). The data write pointer, shared with the temporary storage section (Data15) of the "part 15", is updated in response to the audio waveform data writing to the temporary storage section (Data16). At that time, the audio waveform data readout from the storage device 4 or the like is stopped so that the audio waveform data writing into the temporary storage section (Data15) of "part 15" is stopped, and thus, audio waveform data having so far been stored in a portion of the temporary storage section (Data15) that corresponds to the portion of the temporary storage section (Data16) where the audio waveform data has been overwritten is erased. After that, the CPU 1 terminates the instant audio waveform data read process.

Namely, the audio waveform data read process operates as follows. For the part currently set as the read part, audio waveform data is read out from the storage device 4 or the like and written into the temporary storage section 3a. But, for the part not currently set as the read part, no audio waveform data is read out from the storage device 4 or the like and thus not written into the temporary storage section 3a. Because the read part is determined in accordance with the tempo magnification and the limit value of the performance tempo as noted above, no part for which a processing load associated with time stretch control necessary for generating a reproduced waveform signal corresponding to a designated performance tempo (i.e. a load associated with write control for writing audio waveform data into the temporary storage sections 3a and read control for reading out the written audio waveform data from the temporary storage sections 3a) is great or which is determined to involve great waveform connection deterioration is never set as the read part.

Figure 10:
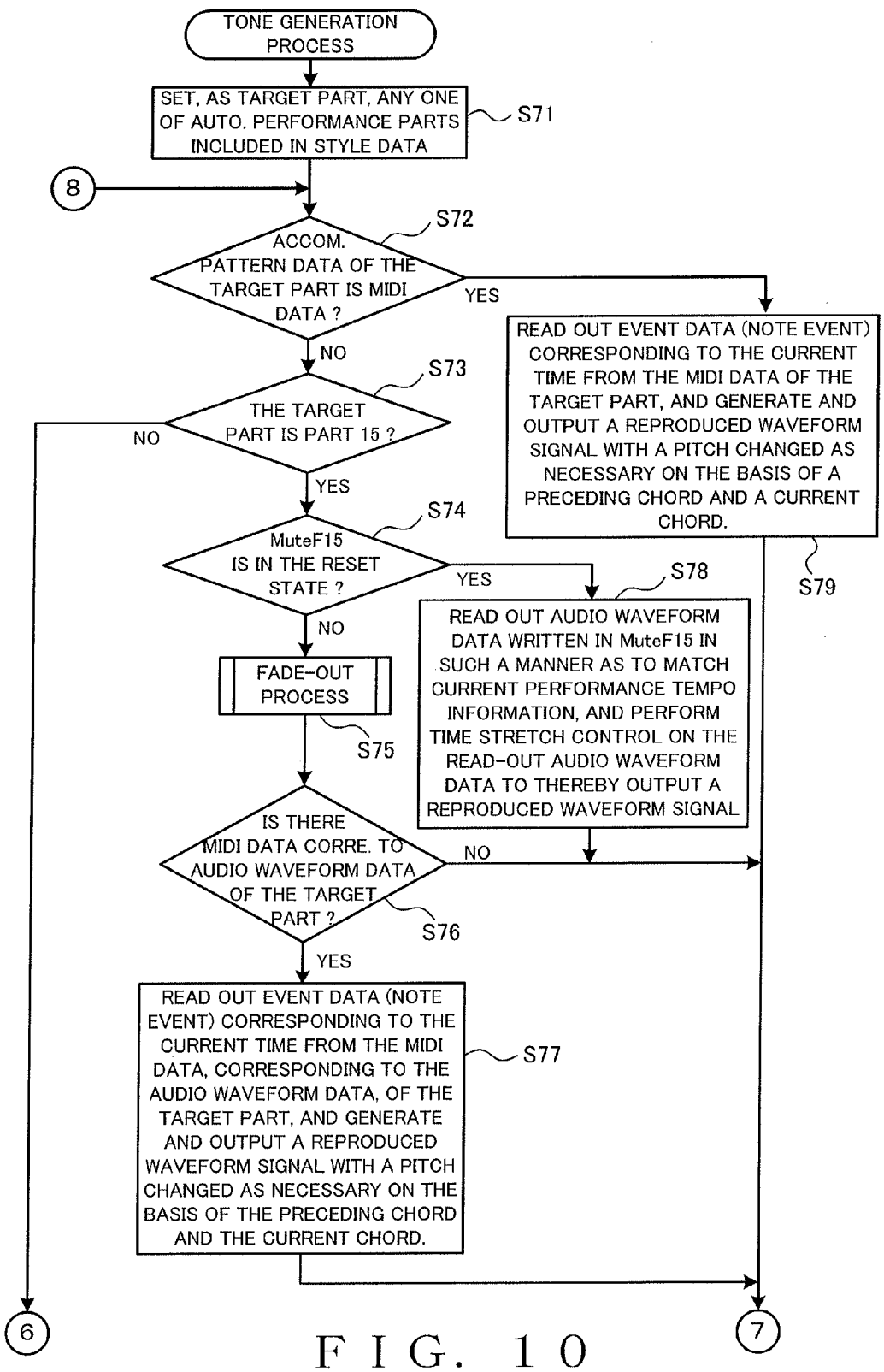
FIG. 10 is a flow chart showing a portion of an example of a tone generation process.
Figure 11:
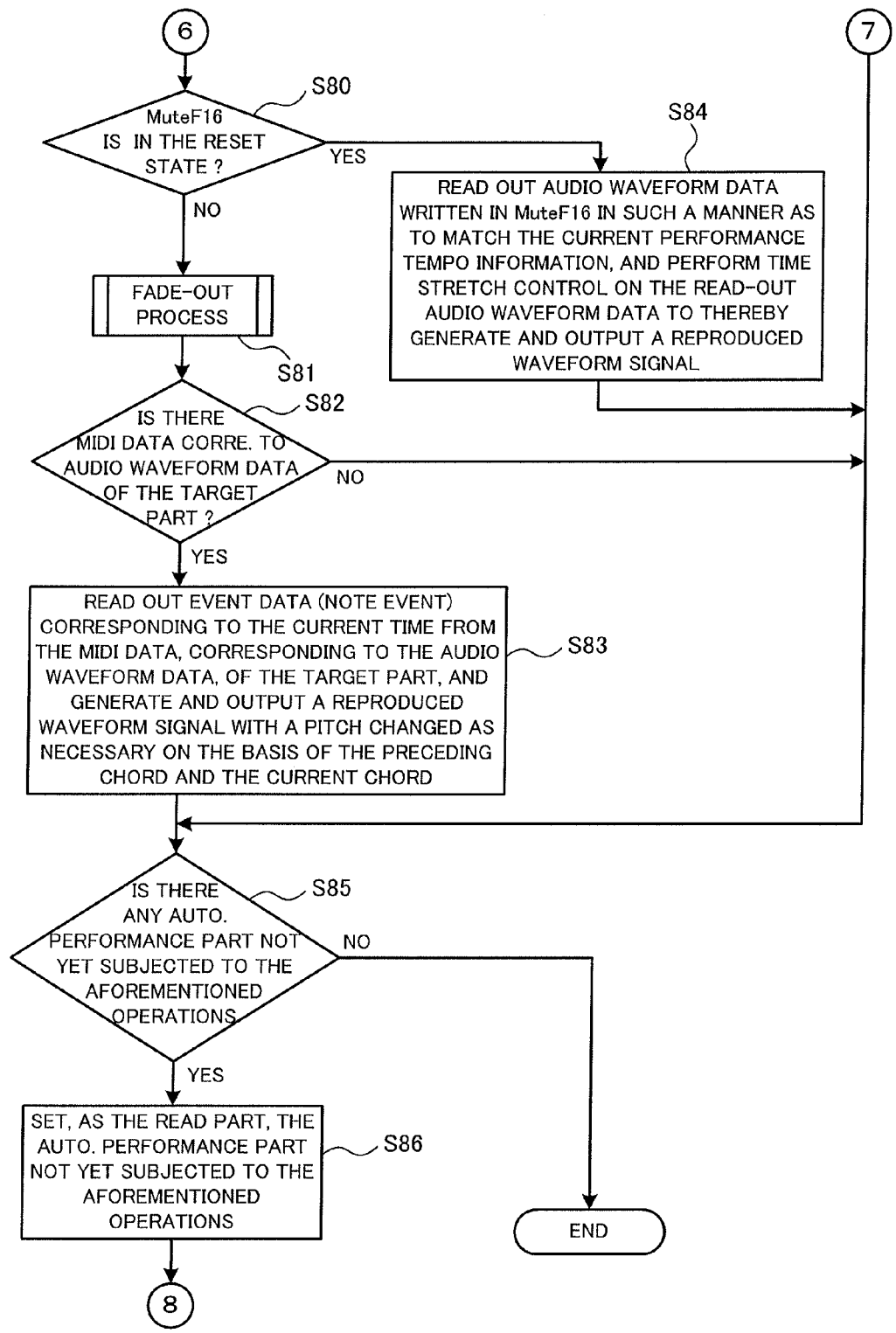
FIG. 11 is a flow chart showing the remaining portion of the tone generation process that follows the portion shown in FIG. 10.

Next, with reference to FIGS. 10 and 11, a description will be given about the "tone generation process" (see step S19 of FIG. 5). FIGS. 10 and 11 are a flow chart showing an example of the tone generation process. Note that the tone generation process is shown in two sections, i.e. FIGS. 10 and 11, for convenience of illustration.

At step S71, as shown in FIG. 10, any one of automatic performance parts which accompaniment pattern data included in style data have already been allocated to is set as a target part. At next step S72, a determination is made as to whether the accompaniment pattern data of the target part is MIDI data. If the accompaniment pattern data of the target part is MIDI data as determined at step S72 (YES determination at step S72), event data (note event) corresponding to the current time is read out from the MIDI data of the target part, and a reproduced waveform signal with a pitch changed as necessary on the basis of a preceding chord and a current chord is generated and output (step S79). After that, the CPU 1 proceeds to step S85 of FIG. 11.

If, on the other hand, the accompaniment pattern data of the target part is audio waveform data, not MIDI data (NO determination at step S72), a further determination is made, at step S73, as to whether the target part is the "part 15". If the target part is not the "part 15" (NO determination at step S73), the CPU 1 branches to S80 shown in FIG. 11. If, on the other hand, the target part is the "part 15" (YES determination at step S73), a further determination is made, at step S74, as to whether MuteF15 is in the reset state "0". If MuteF15 is in the reset state "0" as determined at step S74 (YES determination at step S74), audio waveform data written in MuteF15 is read out in such a manner as to match current performance tempo information, and time stretch control is performed on the read-out audio waveform data to thereby generate and output a reproduced waveform signal (step S78). After that, the CPU 1 proceeds to step S85 of FIG. 11.

If MuteF15 is in the set state as determined at step S74 (NO determination at step S74), a fade-out process is performed at step S75. Details of the fade-out process will be discussed later with reference to FIG. 12, but the fade-out process may be omitted as the case may be. At step S76, a determination is made as to whether there is MIDI data corresponding to the audio waveform data of the target part. If there is no MIDI data corresponding to the audio waveform data of the target part as determined at step S76 (NO determination at step S76), the CPU 1 proceeds to step S85 of FIG. 11. If, on the other hand, there is MIDI data corresponding to the audio waveform data of the target part (YES determination at step S76), event data (note event) corresponding to the current time is read out from the MIDI data, corresponding to the audio waveform data, of the target part, and a reproduced waveform signal with a pitch changed as necessary on the basis of the preceding chord and the current chord is generated and output (step S77). After that, the CPU 1 proceeds to step S85 of FIG. 11.

As shown in FIG. 11, a further determination is made, at step S80, as to whether MuteF16 is in the reset state "0". If MuteF16 is in the reset state "0" as determined at step S80 (YES determination at step S80), audio waveform data written in MuteF16 is read out in such a manner as to match the current performance tempo information, and time stretch control is performed on the read-out audio waveform data to thereby generate and output a reproduced waveform signal (step S84). After that, the CPU 1 proceeds to step S85 of FIG. 11. If, on the other hand, MuteF16 is in the set state as determined at step S80 (NO determination at step S80), a fade-out process is performed at step S81. Details of the fade-out process will be discussed later with reference to FIG. 12, but the fade-out process may be omitted as the case may be.

At step S82, a further determination is made as to whether there is MIDI data corresponding to the audio waveform data of the target part. Such MIDI data corresponding to the audio waveform data need not be exactly identical in performance pattern (accompaniment pattern) to the audio waveform data and may be MIDI data having a performance pattern (accompaniment pattern) capable of substituting for the performance pattern of the audio waveform data. If there is no MIDI data corresponding to the audio waveform data of the target part as determined at step S82 (NO determination at step S82), the CPU 1 proceeds to step S85 of FIG. 11. If, on the other hand, there is MIDI data corresponding to the audio waveform data of the target part (YES determination at step S82), event data (note event) corresponding to the current time is read out from the MIDI data, corresponding to the audio waveform data, of the target part, and a reproduced waveform signal with a pitch changed as necessary on the basis of the preceding chord and the current chord is generated and output (step S83).

At step S85, a further determination is made as to whether there is any automatic performance part having not yet been subjected to the aforementioned operations. If there is an automatic performance part having not yet been subjected to the aforementioned operations as determined at step S85 (YES determination at step S85), the automatic performance part having not been subjected to the aforementioned operations is set as the target part at step S86, and the CPU 1 reverts to step S72 of FIG. 10 to repeat the operations of steps S72 to S86. If, on the other hand, there is an automatic performance part having not been subjected to the aforementioned operations as determined at step S85 (NO determination at step S85), the CPU 1 terminates the instant tone generation process.

Figure 12:
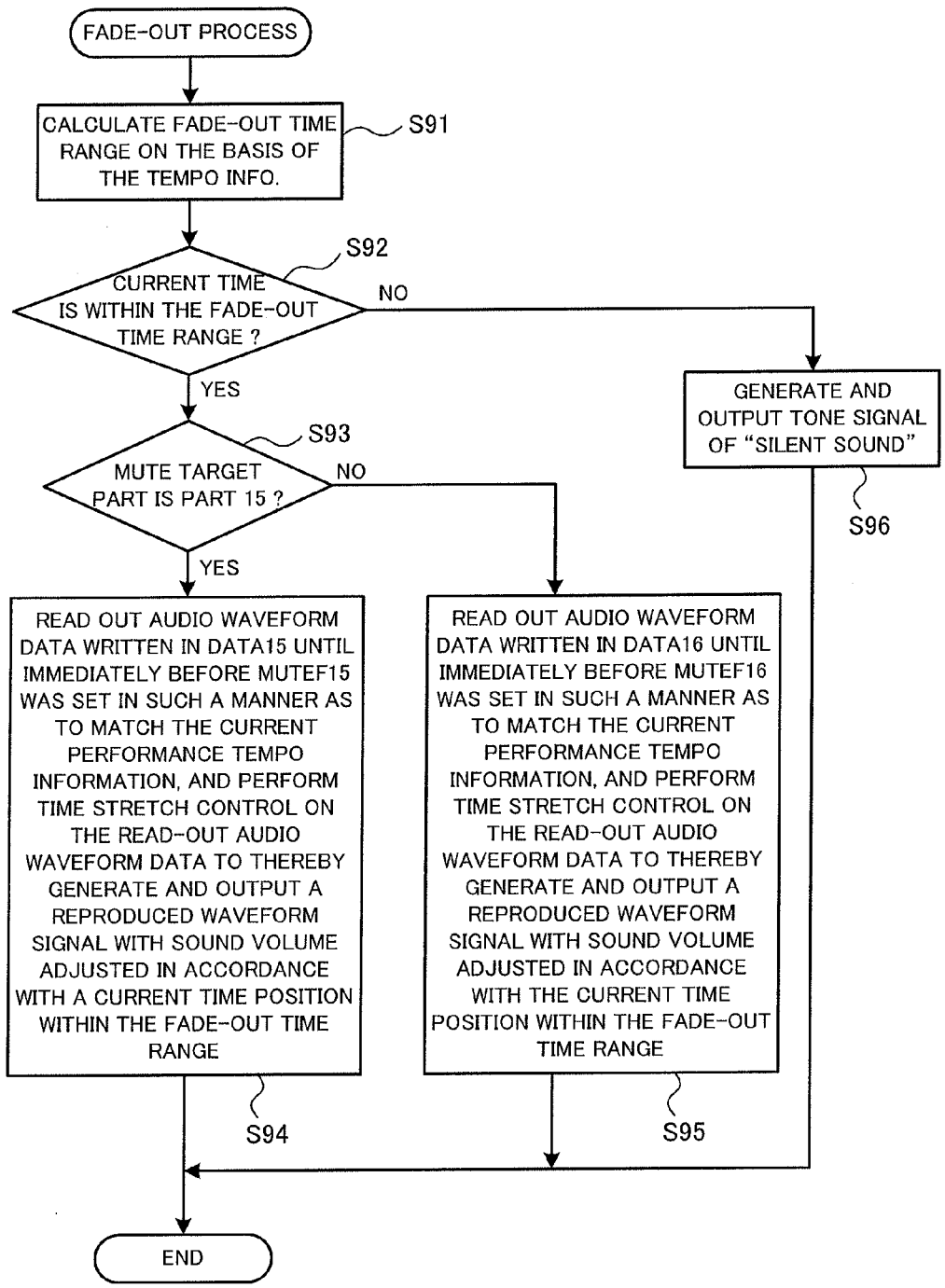
FIG. 12 is a flow chart of an example of a fade-out process.

Next, a description will be given about the above-mentioned "fade-out process" (see step S75 of FIG. 10 and step S81 of FIG. 11). FIG. 12 is a flow chart showing an example of the fade-out process.

At step S91, a fade-out time range is calculated on the basic of current performance tempo information. At next step S92, a determination is made as to whether the current time is within the fade-out time range. If the current time is not within the fade-out time range as determined at step S92 (NO determination at step S92), a reproduced waveform signal of a "silent sound" is generated and output in accordance with the current performance tempo information at step S96, after which the CPU terminates the instant tone generation process.

If, on the other hand, the current time is within the fade-out time range as determined at step S92 (YES determination at step S92), the CPU 1 goes to step S93, where a determination is made, on the basis of the mute flags (MuteF15 and MuteF16), as to whether the part to be muted (i.e., mute target part) is "part 15" (i.e., MuteF15 is "1") or "part 16" (i.e., MuteF16 is "1"). If the mute target part is the "part 15" as determined at step S93 (YES determination at step S93), audio waveform data written in Data15 until immediately before MuteF15 was set at "1" is read out in such a manner as to match the current performance tempo information, and time stretch control is performed on the read-out audio waveform data to thereby generate a reproduced waveform signal, but also the reproduced waveform signal is output with a sound volume adjusted in accordance with a current time position within the fade-out time range (step S94). If, on the other hand, the mute target part is the "part 16" as determined at step S93 (NO determination at step S93), audio waveform data written in Data16 until immediately before MuteF16 was set at "1" is read out in such a manner as to match the current performance tempo information, and time stretch control is performed on the read-out audio waveform data to thereby generate a reproduced waveform signal, but also the reproduced waveform signal is output with a sound volume adjusted in accordance with the current time position within the fade-out time range (step S95).

The tone control circuit 10 receives, at one time, reproduced waveform signals of a predetermined number of samples at the time of waveform reproduction, automatically and directly reads out the reproduced waveform signals one sample by one sample, mixes (adds together) the reproduced waveform signals of a plurality of tracks, generated in response to an event of MIDI data, by means of a signal mixing circuit (not shown), and then outputs the mixed reproduced waveform signal to a D/A converter circuit (not shown). Further, the tone control circuit 10 includes a multiplication circuit (not shown) for controlling sound volumes of individual tracks when mixing the reproduced waveform signals. Furthermore, the tone control circuit 10 includes, for individual ones of the tracks, multiplication circuits (not shown) for performing sound volume control on the reproduced waveform signals read out one sample by one sample, and thus, the fade-out control can be realized by the CPU 1 merely giving a parameter indicative of "zero sound volume". To implement the fade-out control, it is only necessary that the CPU 1 supply, at the time of mute cancellation, information indicative of a target sound volume, such as a value of a user operation or settings included in accompaniment pattern data.

Whereas the embodiment of the automatic performance apparatus of the present invention has been described above in relation to the control where reproduction of audio waveform data is limited in response to a tempo speed-up, reproduction of audio waveform data may be limited in response to a tempo slow-down. If a performance tempo is set considerably slower than a recommended tempo (reference tempo), it does not present any problem in terms of the load on the CPU 1, but it tends to be problematic in that sound quality deteriorates. Thus, a limit value (lower limit value shown in FIG. 4) of the performance tempo to be applied in a case where the performance tempo should slow down may be set in advance so that whether or not to perform tone generation based on audio waveform data can be determined in accordance with the thus-set limit value. Namely, upper and lower limit values of the performance tempo may be set in advance as illustratively shown in FIG. 4 so that readout of waveform data is continued when the tempo ratio based on the set performance tempo falls within a range between the upper and lower limit values while the readout of the waveform data is stopped when the tempo ratio based on the set performance tempo falls outside the range between the upper and lower limit values.

Further, in the above-described embodiment, whether or not reproduction of audio waveform data should be limited or not is determined in accordance with relationship between a performance tempo and a reference tempo (recommended tempo) (e.g., a ratio of the performance tempo to the reference tempo), and, upon determination that the reproduction of the audio waveform data should be limited, the reproduction of the audio waveform data is stopped. However, the present invention is not so limited, and the reproduction of the audio waveform data may be continued with a resolution of the reproduction process lowered. For example, a resolution of the time axis expansion/contraction control, by the time axis control section 8*b*, on audio waveform data may be lowered in order to lower the resolution of the reproduction process. Lowering of the resolution of the time axis expansion/contraction control of audio waveform data can be implemented on the basis of lowering of a sampling frequency of the audio waveform data to be read out from the storage device 4 as a target of the time axis expansion/contraction control. The processing load on the CPU 1 can be reduced by lowering the sampling frequency of the audio waveform data to be read out from the storage device 4 to thereby lower the resolution of the time axis expansion/contraction control as noted above. In such a case, audio waveform data degenerated due to the lowering of the resolution of the time axis expansion/contraction control is generated, which may, however, be somewhat advantageous as compared to a case where the reproduction is completely stopped because performance tones can be reproduced. For example, in a case where there is no same or similar MIDI data of the same part capable of substituting for the audio waveform data, generation of such degenerated audio waveform data can be effectively utilized. Specifically, for that purpose, control may be performed to lower the resolution of the time axis expansion/contraction control for that part in response to respective set states of the mute flags of the individual parts in the above-described embodiment.

Note that "waveform data" mentioned in the appended claims corresponds to the "audio waveform data" in the above-described embodiment and modifications. Further, in the above-described embodiment and modifications, the storage device 4 (or other storage means, such as the ROM 2), having stored therein audio waveform data as well as style data, functions as a "storage section storing waveform data of a music performance based on a desired reference tempo" recited in the appended claims. Further, the CPU 1 and the operations of step S21 (FIG. 6) etc. performed by the CPU 1 function as an "acquisition section configured to acquire information designating a variable performance tempo" recited in the appended claims. Further, the CPU 1 and the operations of steps S22, S25, S27, S28, S30, S31, S33 (FIG. 6), etc. performed by the CPU 1 function as a "determination section configured to determine, in accordance with relationship between the performance tempo and the reference tempo, whether reproduction of the waveform data should be limited or not" recited in the appended claims. Further, the audio reproduction section, the CPU 1 and the operations of steps S74, S75, S78 (FIG. 10), steps S80, S81, S84 (FIG. 11), etc. performed by the CPU 1 functions as an "audio reproduction section configured to reproduce the waveform data stored in the storage section, the audio reproduction section performing time axis expansion/contraction control on the waveform data to be reproduced in accordance with relationship between the performance tempo and the reference tempo in order to reproduce the waveform data in accordance with the performance tempo, wherein, when the determination section determines that the reproduction of the waveform data should be limited, the audio reproduction section performs one of an operation for stopping the reproduction of the waveform data and an operation for continuing the reproduction of the waveform data with a resolution of a reproduction process lowered" recited in the appended claims.

Further, the CPU 1 performing the control for limiting reproduction of audio waveform data in response to a tempo speed-up and the operations of steps S22, S25, S27, S28, S30, S31, S33 (FIG. 6), etc. performed by the CPU 1 in the above-described embodiment function as a "determination section configured to determine that the reproduction of the waveform data should be limited when a predetermined first condition that the performance tempo is too fast as compared to the reference tempo is satisfied". Further, the CPU 1 and the operations of steps S74, S75, S78 (FIG. 10), steps S80, S81, S84 (FIG. 11), etc. performed by the CPU 1 in response to the determination by the determination section function as an "audio reproduction section configured to perform, in response to the determination based on the first condition by the determination section that the reproduction of the waveform data should be limited, one of the operation for stopping the reproduction of the waveform data and the operation for continuing the reproduction of the waveform data with the resolution of the reproduction process lowered" recited in the appended claims.

Further, the CPU 1 performing the control for limiting reproduction of audio waveform data in response to a tempo slow-down and individual related operations in the above-described embodiment function as a "determination section configured to determine that the reproduction of the waveform data should be limited when a predetermined second condition that the performance tempo is too slow as compared to the reference tempo is satisfied" and as an "audio reproduction section configured to perform, in response to the determination based on the second condition by the determination section that the reproduction of the waveform data should be limited, the operation for stopping the reproduction of the waveform data" recited in the appended claims.

Further, the MIDI tone generator section 9 and related processing by the CPU 1 functions as a "tone generation section configured to generate a tone generation section based on tone generation instruction data, such as data of a MIDI format", and the audio reproduction section 8, the CPU 1 and operations of step S77 (FIG. 10) etc. function as an "audio reproduction section configured to stop the reproduction of the waveform data in response to the determination by the determination section that the reproduction of the waveform data should be limited, the tone generation section generating, based on the tone generation instruction data, a tone waveform corresponding to the waveform data whose reproduction should stopped".

According to the above-described automatic performance apparatus of the present invention, when the time axis expansion/contraction control is to be performed for generating audio waveform data of a desired performance tempo based on audio waveform data performed in accordance with a desired reference tempo, a determination is made, based on relationship between an acquired performance tempo and the reference tempo, as to whether or not to limit reproduction of the audio waveform data. Here, if there is such a gap between the performance tempo and the reference tempo due to an influence of a processing delay in the time axis expansion/contraction control that may generate a tone delayed from the performance tempo, that may generate a tone of a reduced sound quality or that may freeze the processing system, it is determined that the reproduction of the audio waveform data should be limited. If it is determined that the reproduction of the audio waveform data should be limited, one of the operation for stopping the reproduction of the waveform data and the operation for continuing the reproduction of the waveform data with the resolution of the reproduction process lowered is performed. If the relationship between the performance tempo and the reference tempo is such that the audio waveform data is reproduced at a performance tempo that may cause a processing delay or sound quality deterioration, the reproduction of the audio waveform data is stopped, so that it is possible to solve problems, such as generation of a tone delayed from the desired performance tempo, noise-like intermittent sound skipping and generation of a tone having a considerably lowered sound quality. Additionally, it is possible to prevent freezing of the processing system and thereby forestall various inconveniences associated with the freezing of the processing system. Lowering the resolution of the reproduction process, on the other hand, comprises lowering the resolution of the time axis expansion/contraction control of the waveform data. By thus lowering the resolution of the reproduction process, it is possible to prevent processing delays, i.e. prevent the processing from delaying from a desired performance tempo.

Whereas the embodiment of the present invention has been illustratively described with reference to the accompanying drawings, the present invention is not necessarily limited to the described embodiment. For example, although the embodiment of the present invention has been described above as constructed in such a manner that, in a case where style data includes, as accompaniment pattern data, audio waveform data and MIDI data corresponding to the audio waveform data, it generates a tone by reproducing MIDI data and by stopping readout of the audio waveform data to thereby generate no tone based on the audio waveform data (see step S79 of FIG. 10), the present invention is not so limited. For example, the present invention may start tone generation control based on the MIDI data in response to a start of an automatic performance and then control whether or not to mute a tone generated on the basis of the MIDI data in accordance with a performance tempo. Namely, if the performance tempo is such a tempo that does not influence tone generation based on the audio waveform data, the present invention mutes a tone generated on the basis of the MIDI data and then generates a tone based on the audio waveform data. If, on the other hand, the performance tempo is such a tempo that influences tone generation based on the audio waveform data, the present invention cancels muting of a tone generated based on the MIDI data and sounds the tone generated based on the MIDI data.

It should be appreciated that, where the automatic performance apparatus of the present invention is applied to an electronic musical instrument, the electronic musical instrument may be of any one of various types other than a keyboard instrument type, such as a stringed instrument type, wind instrument type and percussion instrument type.

It should also be appreciated that a start/stop of an automatic performance may be instructed by other than a user's operation of a play/stop button. For example, a start of automatic performance may be instructed by automatically detecting a start of a user's performance operation, and a stop of the automatic performance may be instructed by detecting an end of the user's performance operation (e.g., by automatically detecting when no performance input has been made for about ten seconds). An automatic performance may be stopped immediately when a stop of an automatic performance has been instructed. Alternatively, the automatic performance may be stopped after accompaniment pattern data has been automatically performed to the end or to an end of an appropriate tone.

The invention claimed is:

1. An automatic performance apparatus comprising:
   a storage section storing waveform data of a music performance based on a desired reference tempo;
   an acquisition section configured to acquire information designating a variable performance tempo;
   a determination section configured to determine, in accordance with relationship between the performance tempo and the reference tempo, whether reproduction of the waveform data is to be limited or not; and
   an audio reproduction section configured to reproduce the waveform data stored in said storage section, said audio reproduction section performing, in order to reproduce the waveform data in accordance with the performance tempo, time axis expansion/contraction control on the waveform data to be reproduced in accordance with the relationship between the performance tempo and the reference tempo, wherein, when the determination section has determined that the reproduction of the waveform data is to be limited, the audio reproduction section performs one of an operation for stopping the reproduction of the waveform data and an operation for continuing the reproduction of the waveform data with a resolution of a reproduction process lowered.

2. The automatic performance apparatus as claimed in claim 1, wherein, when a predetermined first condition that the performance tempo is too fast as compared to the reference tempo is satisfied, said determination section determines that the reproduction of the waveform data is to be limited, and
   said audio reproduction section performs, in response to a determination based on the first condition by the determination section that the reproduction of the waveform data is to be limited, one of the operation for stopping the reproduction of the waveform data and the operation for continuing the reproduction of the waveform data with the resolution of the reproduction process lowered.

3. The automatic performance apparatus as claimed in claim 1, wherein, when a predetermined second condition that the performance tempo is too slow as compared to the reference tempo is satisfied, said determination section determines that the reproduction of the waveform data is to be limited, and
   said audio reproduction section performs, in response to a determination based on the second condition by the determination section that the reproduction of the waveform data is to be limited, performs the operation for stopping the reproduction of the waveform data.

4. The automatic performance apparatus as claimed in claim 1, which further comprises a tone generation section configured to generate a tone waveform based on tone generation instruction data, and
   wherein, in response to a determination by the determination section that the reproduction of the waveform data is to be limited, said audio reproduction section performs the operation for stopping the reproduction of the waveform data, and said tone generation section generates, based on the tone generation instruction data, a tone waveform corresponding to the waveform data whose reproduction is to be stopped.

5. The automatic performance apparatus as claimed in claim 1, wherein, in performing the time axis expansion/contraction control, said audio reproduction section performs write control for writing the waveform data into a temporary storage section and read control for reading out the written waveform data from the temporary storage section.

6. The automatic performance apparatus as claimed in claim 5, wherein, when a gap between the acquired performance tempo and the reference tempo is more than a predetermined value, indicating that a processing load associated with the write and read control for writing and reading out the waveform data to and from the temporary storage section is great, said determination section determines that the reproduction of the waveform data is to be limited.

7. The automatic performance apparatus as claimed in claim 6, wherein, when said determination section has determined that the gap is more than a predetermined value, indicating that the processing load associated with the write and read control for writing and reading out the waveform data to and from the temporary storage section is great, said audio reproduction section stops writing the waveform data into the temporary storage section, but, when said determination section has determined that the gap is less than a predetermined value, indicating that the processing load associated with the write and read control for writing and reading out the waveform data to and from the temporary storage section is small, said audio reproduction section resumes writing the waveform data into the temporary storage section.

8. The automatic performance apparatus as claimed in claim 1, which further comprises a tone control section configured to, when said audio reproduction section stops the reproduction of the waveform data, perform fade-out control on a tone corresponding to the waveform data whose reproduction is to be stopped.

9. The automatic performance apparatus as claimed in claim 8, wherein, when said audio reproduction section resumes the reproduction of the waveform data whose reproduction has so far been stopped, said tone control section performs fade-in control on a tone corresponding to the waveform data whose reproduction is to be resumed.

10. The automatic performance apparatus as claimed in claim 1, wherein, when said determination section has determined that the reproduction is to be limited, said audio reproduction section performs the operation for continuing the reproduction of the waveform data with the resolution of the reproduction process lowered by lowering a resolution of the time axis expansion/contraction control on the waveform data.

11. The automatic performance apparatus as claimed in claim 10, wherein said lowering the resolution of the time axis expansion/contraction control on the waveform data comprises lowering a sampling frequency of the waveform data to be read out from said storage section as a target of the time axis expansion/contraction control.

12. The automatic performance apparatus as claimed in claim 1, wherein the waveform data stored in said storage section has a predetermined length corresponding to a certain performance pattern, and
said audio reproduction section is configured to repetitively reproduce the waveform data.

13. The automatic performance apparatus as claimed in claim 1, wherein said audio reproduction section is configured to simultaneously reproduce waveform data of a plurality of performance parts, and
said determination section determines, for each of the performance parts and in accordance with a condition defined for the performance part independently of other of the performance parts, whether the reproduction of the waveform data of the performance part is to be limited or not.

14. A computer-implemented method for executing an automatic performance by use of waveform data stored in a non-transitory storage medium, the non-transitory storage medium storing waveform data of a music performance based on a desired reference tempo, the method comprising:
acquiring information designating a variable performance tempo;
determining, in accordance with relationship between the performance tempo and the reference tempo, whether reproduction of the waveform data is to be limited or not; and
reproducing the waveform data stored in the non-transitory storage medium, said reproducing performing, in order to reproduce the waveform data in accordance with the performance tempo, time axis expansion/contraction control on the waveform data to be reproduced in accordance with the relationship between the performance tempo and the reference tempo, wherein, when said determining has determined that the reproduction of the waveform data is to be limited, said reproducing performs one of an operation for stopping the reproduction of the waveform data and an operation for continuing the reproduction of the waveform data with a resolution of a reproduction process lowered.

15. A non-transitory computer-readable storage medium containing a group of instructions executable by a processor for performing a method executing an automatic performance by use of waveform data stored in a non-transitory storage medium, the non-transitory storage medium storing waveform data of a music performance based on a desired reference tempo, the method comprising:
acquiring information designating a variable performance tempo;
determining, in accordance with relationship between the performance tempo and the reference tempo, whether reproduction of the waveform data is to be limited or not; and
reproducing the waveform data stored in the non-transitory storage medium, said reproducing performing, in order to reproduce the waveform data in accordance with the performance tempo, time axis expansion/contraction control on the waveform data to be reproduced in accordance with the relationship between the performance tempo and the reference tempo, wherein, when said determining has determined that the reproduction of the waveform data is to be limited, said reproducing performs one of an operation for stopping the reproduction of the waveform data and an operation for continuing the reproduction of the waveform data with a resolution of a reproduction process lowered.

16. An automatic performance apparatus comprising:
a non-transitory storage medium configured to store waveform data of a music performance based on a desired reference tempo;
a processor configured to:
acquire information designating a variable performance tempo; and
determine, in accordance with relationship between the performance tempo and the reference tempo, whether reproduction of the waveform data is to be limited or not; and
audio reproduction circuitry and the processor configured to reproduce the waveform data stored in said non-transitory storage medium, said audio reproduction circuitry and the processor performing, in order to reproduce the waveform data in accordance with the performance tempo, time axis expansion/contraction control on the waveform data to be reproduced in accordance with the relationship between the performance tempo and the reference tempo, wherein, when the audio reproduction circuitry and the processor have determined that the reproduction of the waveform data is to be limited, the audio reproduction circuitry and the processor perform one of an operation for stopping the reproduction of the waveform data and an operation for continuing the reproduction of the waveform data with a resolution of a reproduction process lowered.

17. The automatic performance apparatus as claimed in claim 16, wherein, in performing the time axis expansion/contraction control, said audio reproduction circuitry and the processor perform write control for writing the waveform data into a non-transitory temporary storage medium and read control for reading out the written waveform data from the non-transitory temporary storage medium.

18. The automatic performance apparatus as claimed in 17, wherein, when a gap between the acquired performance tempo and the reference tempo is more than a predetermined value, indicating that a processing load associated with the write and read control for writing and reading out the waveform data to and from the non-transitory temporary storage medium is great, said audio reproduction circuitry and the processor determine that the reproduction of the waveform data is to be limited.

19. The automatic performance apparatus as claimed in claim 18, wherein, when said processor has determined that the gap is more than a predetermined value, indicating that the processing load associated with the write and read control for writing and reading out the waveform data to and from the non-transitory temporary storage medium is great, said audio reproduction circuitry and the processor stop writing the waveform data into the non-transitory temporary storage medium, but, when said processor has determined that the gap is less than a predetermined value, indicating that the processing load associated with the write and read control for writing and reading out the waveform data to and from the non-transitory temporary storage medium is small, said audio reproduction circuitry and the processor resume writing the waveform data into the non-transitory temporary storage medium.

20. The automatic performance apparatus as claimed in claim 16, wherein, when said processor has determined that the reproduction is to be limited, said audio reproduction circuitry and the processor perform the operation for continuing the reproduction of the waveform data with the resolution of the reproduction process lowered by lowering a resolution of the time axis expansion/contraction control on the waveform data.

* * * * *